US010055019B2

(12) United States Patent
Beran

(10) Patent No.: US 10,055,019 B2
(45) Date of Patent: Aug. 21, 2018

(54) ELECTROMAGNET-LADEN GLOVE FOR HAPTIC PRESSURE FEEDBACK

(71) Applicant: Sony Interactive Entertainment Inc., Tokyo (JP)

(72) Inventor: Erik Beran, Belmont, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 95 days.

(21) Appl. No.: 14/717,915

(22) Filed: May 20, 2015

(65) Prior Publication Data
US 2016/0342207 A1 Nov. 24, 2016

(51) Int. Cl.
G06F 3/01 (2006.01)
A63F 13/24 (2014.01)
A63F 13/812 (2014.01)
A63F 13/285 (2014.01)
A63F 13/577 (2014.01)

(52) U.S. Cl.
CPC .............. *G06F 3/014* (2013.01); *A63F 13/24* (2014.09); *A63F 13/285* (2014.09); *A63F 13/577* (2014.09); *A63F 13/812* (2014.09); *G06F 3/016* (2013.01)

(58) Field of Classification Search
CPC ............. G06F 3/014; G06F 3/041; G06F 3/01
See application file for complete search history.

(56) References Cited

U.S. PATENT DOCUMENTS

| 4,510,939 | A | * | 4/1985 | Brenman | A61B 5/0404 |
| | | | | | 600/384 |
| 5,184,319 | A | * | 2/1993 | Kramer | G06F 3/011 |
| | | | | | 345/156 |
| 8,884,746 | B1 | * | 11/2014 | Cho | G08B 6/00 |
| | | | | | 340/407.1 |
| 9,104,271 | B1 | * | 8/2015 | Adams | G06F 3/0426 |
| 2012/0260220 | A1 | * | 10/2012 | Griffin | G06F 3/033 |
| | | | | | 715/863 |

FOREIGN PATENT DOCUMENTS

EP 1868063 A2 12/2007
JP 2007004588 A 11/2007
KR 20130101367 A 9/2013

OTHER PUBLICATIONS

Repperger et al., statutory invention registration, Reg. No. US H2017 H, Published Apr. 2, 2002.
(Continued)

*Primary Examiner* — Carolyn R Edwards
(74) *Attorney, Agent, or Firm* — Martine Penilla Group, LLP

(57) ABSTRACT

A glove interface object is provided, including: a plurality of magnetic objects positioned on a first side of the glove interface object; a plurality of electromagnets positioned on a second side of the glove interface object opposite the first side, the plurality of electromagnets being positioned substantially opposite the plurality of magnetic objects, wherein each electromagnet is configured when activated to attract one or more of the magnetic objects; a controller configured to control activation and deactivation of the electromagnets based on received haptic feedback data.

20 Claims, 16 Drawing Sheets

(56) References Cited

OTHER PUBLICATIONS

Winter et al., "Use of Magnetorheological Fluid in a Force Feedback Glove", IEEE Transactions on Neural Systems and Rehabilitation Engineering, IEEE Service Center, New York, NY, US, vol. 15, No. 1, Mar. 1, 2007 (Mar. 1, 2007). pp. 2-8, XP011174741, ISSN: 1534-4320, DOI: 10.1109/INSRE.2007.891401.
ISR and Written Opinion, PCT/US2016/031927, dated Aug. 9, 2016, 15 pages.

* cited by examiner

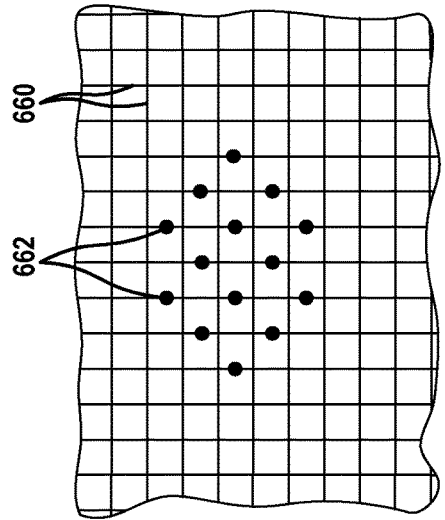
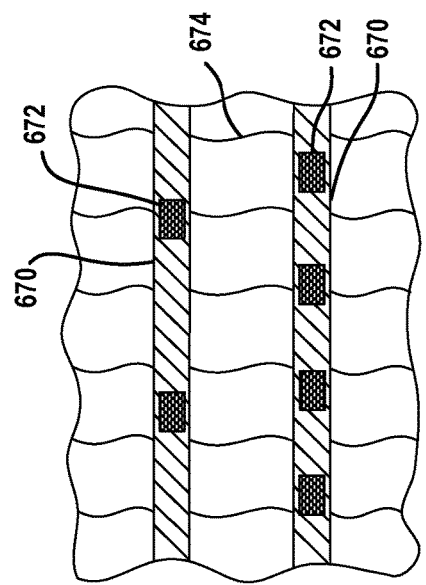
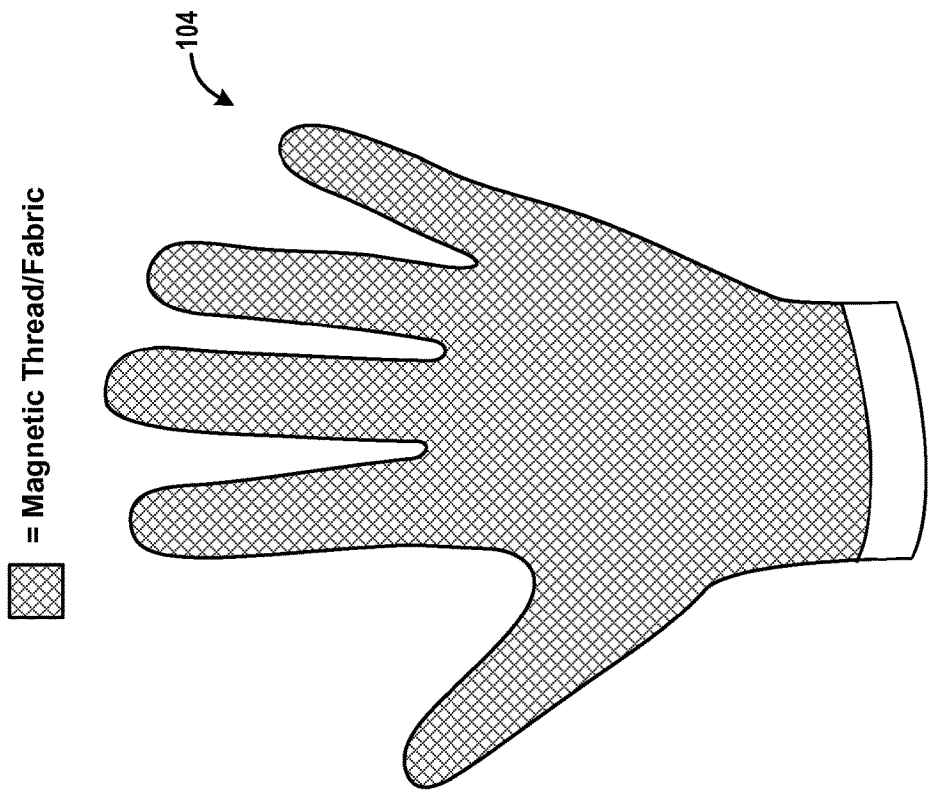
FIG. 6D
FIG. 6E
FIG. 6C

ELECTROMAGNET-LADEN GLOVE FOR HAPTIC PRESSURE FEEDBACK

RELATED APPLICATIONS

This application is related to U.S. application Ser. No. 14/517,741, filed Oct. 17, 2014, entitled "Glove Interface Object," and to U.S. application Ser. No. 14/517,733, filed Oct. 17, 2014, entitled "Thumb Controller," the disclosures of which are incorporated by reference herein.

BACKGROUND

1. Field of the Invention

The present invention relates to an electromagnet-laden glove for haptic pressure feedback, and associated apparatus and methods.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation®, Sony Playstation2® (PS2), Sony Playstation3® (PS3), and Sony Playstation4® (PS4), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between the user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

Another way of accomplishing a more immersive interactive experience is to use a head-mounted display. A head-mounted display is worn by the user and can be configured to present various graphics, such as a view of a virtual space. The graphics presented on a head-mounted display can cover a large portion or even all of a user's field of view. Hence, a head-mounted display can provide a visually immersive experience to the user.

Another growing trend in the industry involves the development of cloud-based gaming systems. Such systems may include a remote processing server that executes a game application, and communicates with a local thin client that can be configured to receive input from users and render video on a display.

It is in this context that embodiments of the invention arise.

SUMMARY

Embodiments of the present invention provide for an electromagnet-laden glove for haptic pressure feedback and associated methods and systems.

Broadly speaking, embodiments provide for a glove interface object having electromagnets attached to the back (dorsal) side of the glove. For example, there may be one electromagnet for each finger segment and one or more electromagnets for the palm. On the front (palmar) side of the glove there is magnetic material (e.g. iron) attached, e.g. in sealed powder form or small strips/bits. Then to provide haptic feedback to enable a user to feel something, specific ones of the electromagnets can be activated, thereby pulling the magnetic material on the front of the glove towards the user's hand. Varying degrees of pressure can be achieved by varying the power applied to the electromagnets, and different sensations are possible through selective activation of the electromagnets. Furthermore, a very fast response time is possible, as the activation of electromagnets and varying of power can be practically instantaneous.

In one embodiment, a glove interface object is provided, including: a plurality of magnetic objects positioned on a first side of the glove interface object; a plurality of electromagnets positioned on a second side of the glove interface object opposite the first side, the plurality of electromagnets being positioned substantially opposite the plurality of magnetic objects, wherein each electromagnet is configured when activated to attract one or more of the magnetic objects; a controller configured to control activation and deactivation of the electromagnets based on received haptic feedback data.

In one embodiment, the haptic feedback data is defined based on contact between a virtual hand and a virtual object in a virtual environment, wherein the haptic feedback data provides for activation of a portion of the electromagnets that are configured to attract a portion of the magnetic objects, the portion of the magnetic objects being positioned on a region of the glove interface object that corresponds to a region of the virtual hand that contacts the virtual object.

In one embodiment, the haptic feedback data provides for deactivation of a second portion of the electromagnets that are configured to attract a second portion of the magnetic objects, the second portion of the magnetic objects positioned on a region of the glove interface object that corresponds to a region of the virtual hand that does not contact the virtual object.

In one embodiment, the haptic feedback data defines a strength of activation of the portion of the electromagnets, wherein the strength of activation is correlated to a level of pressure exerted on the region of the virtual hand that contacts the virtual object.

In one embodiment, the plurality of magnetic objects includes at least one magnetic object defined on at least one phalange segment of each finger portion of the glove interface object; wherein the plurality of electromagnets includes at least one electromagnet defined on at least one phalange segment of each finger portion of the glove interface object.

In one embodiment, the glove interface object further includes at least one sensor configured to generate data identifying a pose of at least a portion of the glove interface object.

In one embodiment, each of the magnetic objects includes a ferromagnetic material.

In one embodiment, the first side is a palmar side of the glove interface object; and wherein the second side is a dorsal side of the glove interface object.

In another embodiment, a system is provided, including: a glove interface object, including, a plurality of magnetic objects positioned on a first side of the glove interface object, a plurality of electromagnets positioned on a second side of the glove interface object opposite the first side, the plurality of electromagnets being positioned substantially opposite the plurality of magnetic objects, wherein each electromagnet is configured when activated to attract one or more of the magnetic objects, a controller configured to control activation and deactivation of the electromagnets based on received haptic feedback data; a computing device configured to generate the haptic feedback data, wherein the haptic feedback data is defined based on contact between a virtual hand and a virtual object in a virtual environment, wherein the haptic feedback data provides for activation of a portion of the electromagnets that are configured to attract a portion of the magnetic objects, the portion of the magnetic objects being positioned on a region of the glove interface object that corresponds to a region of the virtual hand that contacts the virtual object.

In one embodiment, the haptic feedback data provides for deactivation of a second portion of the electromagnets that are configured to attract a second portion of the magnetic objects, the second portion of the magnetic objects positioned on a region of the glove interface object that corresponds to a region of the virtual hand that does not contact the virtual object.

In one embodiment, the haptic feedback data defines a strength of activation of the portion of the electromagnets, wherein the strength of activation is correlated to a level of pressure exerted on the region of the virtual hand that contacts the virtual object.

In one embodiment, the plurality of magnetic objects includes at least one magnetic object defined on at least one phalange segment of each finger portion of the glove interface object; wherein the plurality of electromagnets includes at least one electromagnet defined on at least one phalange segment of each finger portion of the glove interface object.

In one embodiment, the glove interface object further includes at least one sensor configured to generate data identifying a pose of at least a portion of the glove interface object.

In one embodiment, each of the magnetic objects includes a ferromagnetic material.

In one embodiment, the computing device is configured to generate video data for rendering on a head-mounted display, the video data configured to provide a view of the virtual environment when rendered on the head-mounted display.

In another embodiment, a method is provided, including: receiving haptic feedback data, wherein the haptic feedback data is defined based on contact between a virtual hand and a virtual object in a virtual environment; applying the haptic feedback data to activate a portion of a plurality of electromagnets on a glove interface object that are configured to attract a portion of a plurality of magnetic objects on the glove interface objects, the portion of the magnetic objects being positioned on a region of the glove interface object that corresponds to a region of the virtual hand that contacts the virtual object; wherein the plurality of magnetic objects are positioned on a first side of the glove interface object; wherein the plurality of electromagnets are positioned on a second side of the glove interface object opposite the first side, the plurality of electromagnets being positioned substantially opposite the plurality of magnetic objects.

In one embodiment, the haptic feedback data provides for deactivation of a second portion of the electromagnets that are configured to attract a second portion of the magnetic objects, the second portion of the magnetic objects positioned on a region of the glove interface object that corresponds to a region of the virtual hand that does not contact the virtual object.

In one embodiment, the haptic feedback data defines a strength of activation of the portion of the electromagnets, wherein the strength of activation is correlated to a level of pressure exerted on the region of the virtual hand that contacts the virtual object.

In one embodiment, the plurality of magnetic objects includes at least one magnetic object defined on at least one phalange segment of each finger portion of the glove interface object; wherein the plurality of electromagnets includes at least one electromagnet defined on at least one phalange segment of each finger portion of the glove interface object.

In one embodiment, the first side is a palmar side of the glove interface object; and wherein the second side is a dorsal side of the glove interface object.

Other aspects of the invention will become apparent from the following detailed description, taken in conjunction with the accompanying drawings, illustrating by way of example the principles of the invention.

BRIEF DESCRIPTION OF THE DRAWINGS

The invention may be better understood by reference to the following description taken in conjunction with the accompanying drawings in which:

FIG. 6C illustrates the palmar side of the glove interface object 104, in accordance with an embodiment of the invention.

FIG. 6D illustrates a magnified view of a portion of a magnetic fabric, in accordance with an embodiment of the invention.

FIG. 6E illustrates a portion of a magnetic fabric, in accordance with an embodiment of the invention.

DETAILED DESCRIPTION

Figure 1:
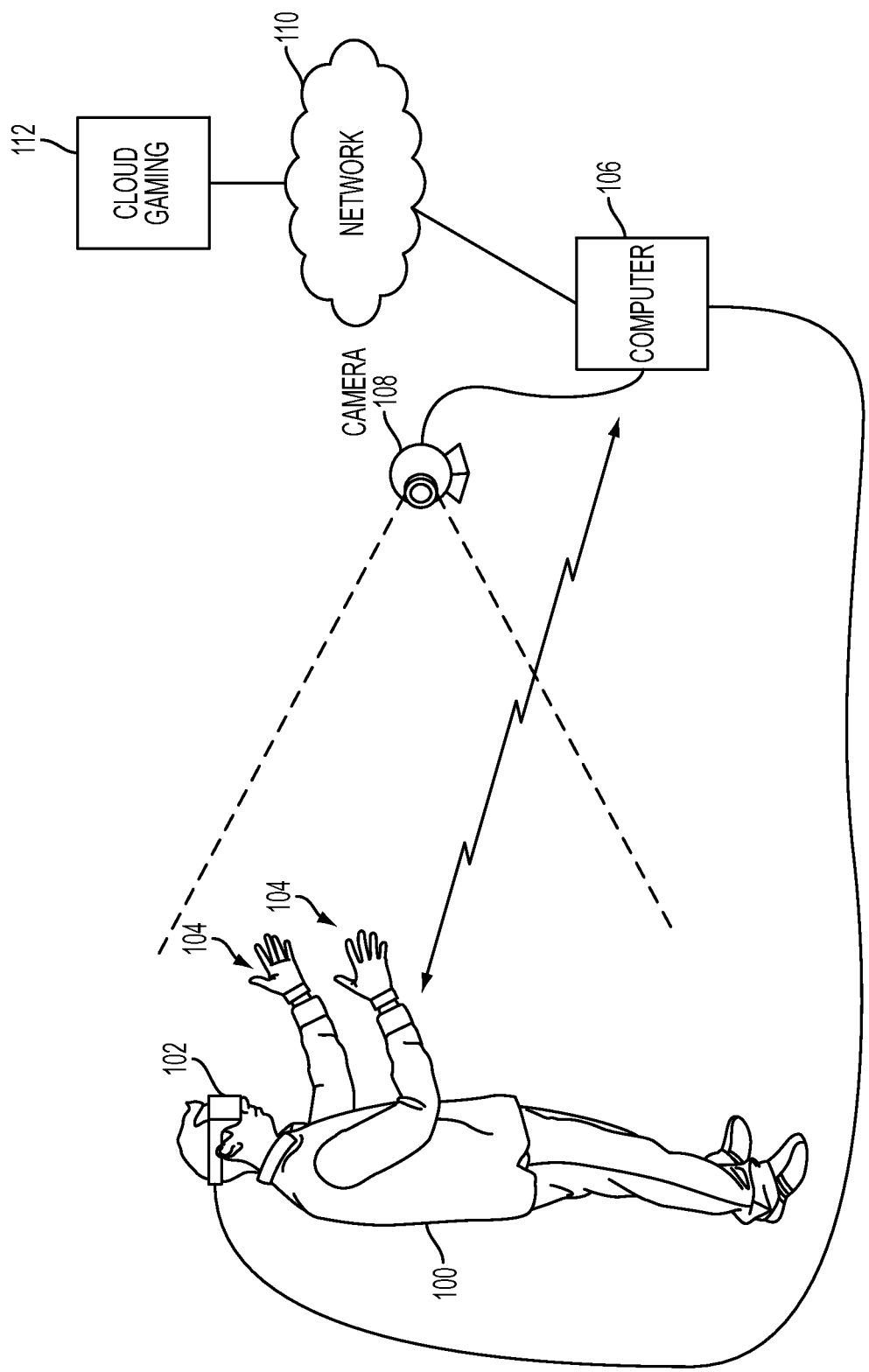
FIG. 1 illustrates a system for interactive gameplay of a video game, in accordance with an embodiment of the invention.

The following embodiments provide a glove interface object and associated systems, methods, and apparatuses.

In one embodiment, the methods, systems, image capture objects, sensors and associated interfaces objects (e.g., gloves) are configured to process data that is configured to be rendered in substantial real time on a display screen. For example, when a user's hand changes positions (e.g., the hand moves, fingers bend, multiple fingers bend, fingers touch other fingers and/or gestures are made), the changes in positions are configured to be displayed in substantial real time on a display.

The display may be the display of a head mounted display (HMD), a display of a second screen, a display of a portable device, a computer display, a display panel, a display of a remotely connected users (e.g., whom may be viewing content or sharing in an interactive experience), or the like. In some embodiments, the captured positions of the user's hand, the pressures sensed, the fingers touched, and/or the hand/finger gestures are used to interact in a video game, in a virtual world scene, a shared virtual space, a video game character, a character that is an extension of the real-world user, or simply provide a way of touching, holding, playing, interfacing or contacting virtual objects shown on a display screen or objects associated with documents, text, images, and the like.

In still other embodiments, virtual gloves may be worn by multiple users in a multi-user game. In such examples, each user may use one or two gloves. The users may be co-located or interfacing in a shared space or shared game from remote locations using a cloud gaming system, networked device and/or social networked collaboration space. In some embodiments, a glove may be used by one or more remote users to interact in a collaborative way to examine documents, screens, applications, diagrams, business information, or the like. In such an implementation, users collaborating may use their gloves to touch objects, move objects, interface with surfaces, press on objects, squeeze objects, toss objects, make gesture actions or motions, or the like.

During collaboration, movements made by one user's hand can appear to the other user as if a real user hand is moving things, objects, or making actions in the collaboration space. Still in a collaboration environment, if two remote users are examining documents, users wearing gloves can point at things on a virtual page, point and draw on a virtual whiteboard, lift and move virtual papers, shake hands, move items, etc. In some collaborative environments, one or more of the users may be wearing an HMD. When the HMD is used in conjunction with the glove or gloves (e.g., worn by one or more users), the users may see a virtual environment in which they can collaborate using their hands, such as moving objects, pages, objects, typing on virtual keyboards, moving virtual pages, tapping on things, pressing on things, etc.

Therefore, it should be understood that the uses of a glove that includes one or more sensors, and/or can detect pressure, and/or can detect bending position of fingers, and/or can detect orientation, and/or can detect inertial movement, etc., can provide for a broad scope of uses. Example uses, without limitation, may include video gaming, entertainment activities, sport related activities, travel and exploring related activities, human-to-human contact (e.g., shaking hands of a remote user), business activities, robotic control (e.g. robotic surgery), etc. In one implementation, this type of interactivity provided by a glove interface may be extended to additional sensors that may be attached or associated with other parts of the human body (e.g., an arm, a leg, a foot, etc.). In addition to gloves, different types of clothes are envisioned, e.g., jackets, pants, shoes, hats, etc.

It will be obvious, however, to one skilled in the art, that the present invention may be practiced without some or all of these specific details. In other instances, well known process operations have not been described in detail in order not to unnecessarily obscure the present invention.

FIG. 1 illustrates a system for interactive gameplay of a video game, in accordance with an embodiment of the invention. A user 100 is shown wearing a head-mounted display (HMD) 102. The HMD 102 is worn in a manner similar to glasses, goggles, or a helmet, and is configured to display a video game or other content to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user.

In one embodiment, the HMD 102 can be connected to a computer 106. The connection to computer 106 can be wired or wireless. The computer 106 can be any general or special purpose computer known in the art, including but not limited to, a gaming console, personal computer, laptop, tablet computer, mobile device, cellular phone, tablet, thin client, set-top box, media streaming device, etc. In one embodiment, the computer 106 can be configured to execute a video game, and output the video and audio from the video game for rendering by the HMD 102.

The user 100 may operate a glove interface object 104 to provide input for the video game. Additionally, a camera 108 can be configured to capture images of the interactive environment in which the user 100 is located. These captured images can be analyzed to determine the location and movements of the user 100, the HMD 102, and the glove interface object 104. In one embodiment, the glove interface object 104 includes a light which can be tracked to determine its location and orientation. Additionally, the HMD 102 may include one or more lights which can be tracked to determine the location and orientation of the HMD 102. The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In another embodiment, the computer 106 functions as a thin client in communication over a network with a cloud gaming provider 112. The cloud gaming provider 112 maintains and executes the video game being played by the user 102. The computer 106 transmits inputs from the HMD 102, the glove interface object 104 and the camera 108, to the cloud gaming provider, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas a vibration feedback command is provided to the glove interface object 104.

In one embodiment, the HMD 102, glove interface object 104, and camera 108, may themselves be networked devices that connect to the network 110 to communicate with the cloud gaming provider 112. For example, the computer 106 may be a local network device, such as a router, that does not otherwise perform video game processing, but facilitates passage of network traffic. The connections to the network by the HMD 102, glove interface object 104, and camera 108 may be wired or wireless.

Additionally, though embodiments in the present disclosure may be described with reference to a head-mounted display, it will be appreciated that in other embodiments, non-head mounted displays may be substituted, including without limitation, a television, projector, LCD display screen, portable device screen (e.g. tablet, smartphone, laptop, etc.) or any other type of display that can be configured to render video and/or provide for display of an interactive scene or virtual environment in accordance with the present embodiments.

Figure 2:
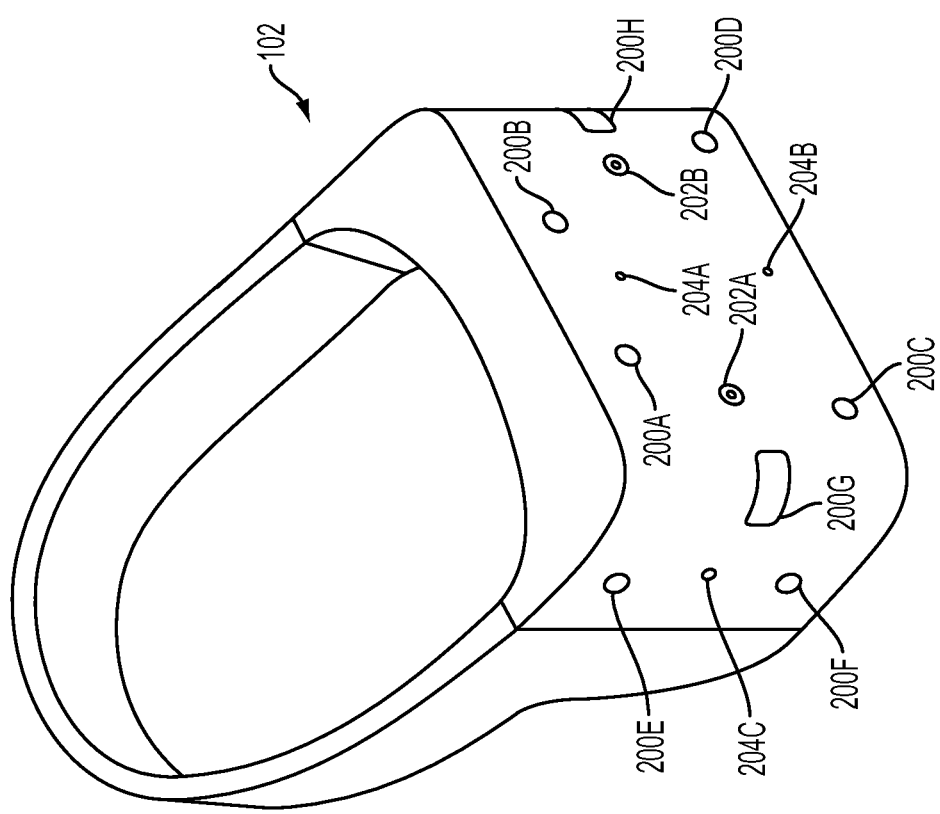
FIG. 2 illustrates a head-mounted display (HMD), in accordance with an embodiment of the invention.

FIG. 2 illustrates a head-mounted display (HMD), in accordance with an embodiment of the invention. As shown, the HMD 102 includes a plurality of lights 200A-H. Each of these lights may be configured to have specific shapes, and can be configured to have the same or different colors. The lights 200A, 200B, 200C, and 200D are arranged on the front surface of the HMD 102. The lights 200E and 200F are arranged on a side surface of the HMD 102. And the lights 200G and 200H are arranged at corners of the HMD 102, so as to span the front surface and a side surface of the HMD 102. It will be appreciated that the lights can be identified in captured images of an interactive environment in which a user uses the HMD 102. Based on identification and tracking of the lights, the location and orientation of the HMD 102 in the interactive environment can be determined. It will further be appreciated that some of the lights may or may not be visible depending upon the particular orientation of the HMD 102 relative to an image capture device. Also, different portions of lights (e.g. lights 200G and 200H) may be exposed for image capture depending upon the orientation of the HMD 102 relative to the image capture device.

In one embodiment, the lights can be configured to indicate a current status of the HMD to others in the vicinity. For example, some or all of the lights may be configured to have a certain color arrangement, intensity arrangement, be configured to blink, have a certain on/off configuration, or other arrangement indicating a current status of the HMD 102. By way of example, the lights can be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights might also be configured to indicate relative intensity levels of gameplay. For example, the intensity of lights, or a rate of blinking, may increase when the intensity of gameplay increases. In this manner, a person external to the user may view the lights on the HMD 102 and understand that the user is actively engaged in intense gameplay, and may not wish to be disturbed at that moment.

The HMD 102 may additionally include one or more microphones. In the illustrated embodiment, the HMD 102 includes microphones 204A and 204B defined on the front surface of the HMD 102, and microphone 204C defined on a side surface of the HMD 102. By utilizing an array of microphones, sound from each of the microphones can be processed to determine the location of the sound's source. This information can be utilized in various ways, including exclusion of unwanted sound sources, association of a sound source with a visual identification, etc.

The HMD 102 may also include one or more image capture devices. In the illustrated embodiment, the HMD 102 is shown to include image capture devices 202A and 202B. By utilizing a stereoscopic pair of image capture devices, three-dimensional (3D) images and video of the environment can be captured from the perspective of the HMD 102. Such video can be presented to the user to provide the user with a "video see-through" ability while wearing the HMD 102. That is, though the user cannot see through the HMD 102 in a strict sense, the video captured by the image capture devices 202A and 202B can nonetheless provide a functional equivalent of being able to see the environment external to the HMD 102 as if looking through the HMD 102. Such video can be augmented with virtual elements to provide an augmented reality experience, or may be combined or blended with virtual elements in other ways. Though in the illustrated embodiment, two cameras are shown on the front surface of the HMD 102, it will be appreciated that there may be any number of externally facing cameras installed on the HMD 102, oriented in any direction. For example, in another embodiment, there may be cameras mounted on the sides of the HMD 102 to provide additional panoramic image capture of the environment.

Figure 3:
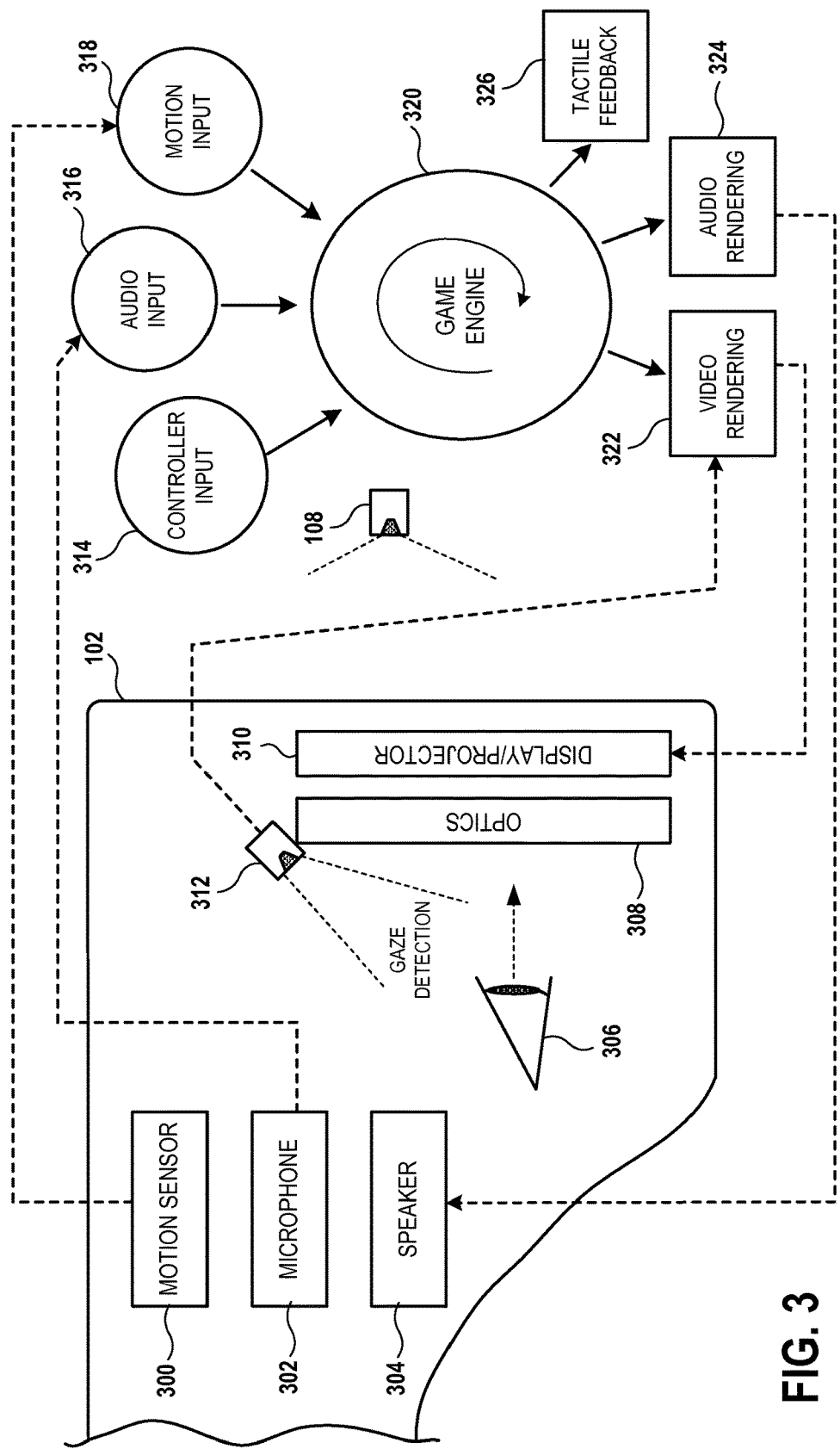
FIG. 3 conceptually illustrates the function of a HMD in conjunction with an executing video game, in accordance with an embodiment of the invention.

FIG. 3 conceptually illustrates the function of the HMD 102 in conjunction with an executing video game, in accordance with an embodiment of the invention. The executing video game is defined by a game engine 320 which receives inputs to update a game state of the video game. The game state of the video game can be defined, at least in part, by values of various parameters of the video game which define various aspects of the current gameplay, such as the presence and location of objects, the conditions of a virtual environment, the triggering of events, user profiles, view perspectives, etc.

In the illustrated embodiment, the game engine receives, by way of example, controller input 314, audio input 316 and motion input 318. The controller input 314 may be defined from the operation of a gaming controller separate from the HMD 102, such as a handheld gaming controller (e.g. Sony DUALSHOCK®4 wireless controller, Sony Playstation®Move motion controller) or glove interface object 104. By way of example, controller input 314 may include directional inputs, button presses, trigger activation, movements, gestures, or other kinds of inputs processed from the operation of a gaming controller. The audio input 316 can be processed from a microphone 302 of the HMD 102, or from a microphone included in the image capture device 108 or elsewhere in the local environment. The motion input 318 can be processed from a motion sensor 300 included in the HMD 102, or from image capture device 108 as it captures images of the HMD 102. The game engine 320 receives inputs which are processed according to the configuration of the game engine to update the game state of the video game. The game engine 320 outputs game state data to various rendering modules which process the game state data to define content which will be presented to the user.

In the illustrated embodiment, a video rendering module 322 is defined to render a video stream for presentation on the HMD 102. The video stream may be presented by a display/projector mechanism 310, and viewed through optics 308 by the eye 306 of the user. An audio rendering module 304 is configured to render an audio stream for listening by the user. In one embodiment, the audio stream is output through a speaker 304 associated with the HMD 102. It should be appreciated that speaker 304 may take the form of an open air speaker, headphones, or any other kind of speaker capable of presenting audio.

In one embodiment, a gaze tracking camera 312 is included in the HMD 102 to enable tracking of the gaze of the user. The gaze tracking camera captures images of the user's eyes, which are analyzed to determine the gaze direction of the user. In one embodiment, information about the gaze direction of the user can be utilized to affect the video rendering. For example, if a user's eyes are determined to be looking in a specific direction, then the video rendering for that direction can be prioritized or emphasized, such as by providing greater detail or faster updates in the region where the user is looking. It should be appreciated that the gaze direction of the user can be defined relative to the head mounted display, relative to a real environment in which the user is situated, and/or relative to a virtual environment that is being rendered on the head mounted display.

Broadly speaking, analysis of images captured by the gaze tracking camera 312, when considered alone, provides for a gaze direction of the user relative to the HMD 102. However, when considered in combination with the tracked location and orientation of the HMD 102, a real-world gaze direction of the user can be determined, as the location and orientation of the HMD 102 is synonymous with the location and orientation of the user's head. That is, the real-world gaze direction of the user can be determined from tracking the positional movements of the user's eyes and tracking the location and orientation of the HMD 102. When a view of a virtual environment is rendered on the HMD 102, the real-world gaze direction of the user can be applied to determine a virtual world gaze direction of the user in the virtual environment.

Additionally, a tactile feedback module 326 is configured to provide signals to tactile feedback hardware included in either the HMD 102 or another device operated by the user, such as a controller 104. The tactile feedback may take the form of various kinds of tactile sensations, such as vibration feedback, temperature feedback, pressure feedback, etc.

As has been noted, the HMD device described herein is capable of providing a user with a highly immersive experience, enveloping a large proportion or even an entirety of a user's field of vision. In light of this immersive aspect of the HMD experience, it is desirable to provide intuitive control mechanisms to the user, especially as the user may not be able to see their own hands or objects (e.g. controller) they are holding. Thus, in accordance with embodiments of the invention described herein, methods, apparatus, and systems are provided for a glove interface object.

Throughout the present disclosure, reference is made to the glove interface object and the user's hand, including the fingers, palm, and other portions thereof. For purposes of ease of description and readability of the present disclosure, it will be understood by those skilled in the art that the glove interface object and the user's hand (and/or portion thereof) may in many instances be referenced interchangeably and/or in the alternative. That is, an activity (e.g. pose, position, movement, orientation, location, action, etc.) defined by a user's hand, also pertains to the glove interface object that is being worn on the user's hand, as the glove interface object is configured to detect or facilitate detection of the activity of the user's hand. Therefore, it may be convenient for descriptive purposes to discuss certain aspects in the present disclosure utilizing language pertaining to the user's hand. However, it will be readily appreciated that the glove interface object is worn on the user's hand and that such may apply or in fact be defined by the glove interface object, this being apparent to those skilled in the art from the context of the description.

Figure 4A:
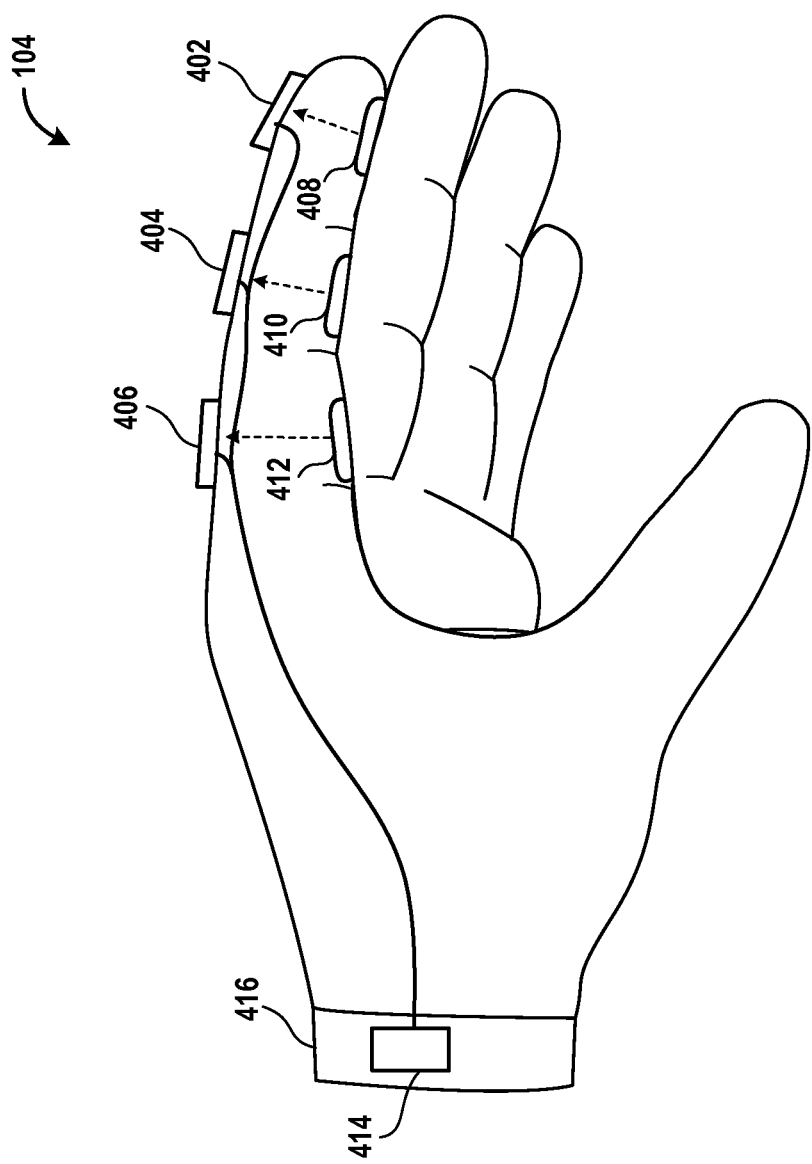
FIG. 4A illustrates a glove interface object for providing haptic feedback, in accordance with an embodiment of the invention.

FIG. 4A illustrates a glove interface object for providing haptic feedback, in accordance with an embodiment of the invention. In the illustrated embodiment, a side view of the glove interface object 104 is shown, so as to illustrate the presence of electromagnets 402, 404, and 406, as well as magnetic objects 408, 410, and 412. The electromagnets 402, 404, and 406 are positioned on the dorsal (back) side of the index finger portion of the glove interface object. The magnetic objects 408, 410, and 412 are positioned on the palmar (front) side of the index finger portion of the glove interface object 104. As shown, the electromagnets 402, 404, and 406 are positioned substantially opposite to the magnetic objects 408, 410, and 412, respectively, so as to define a correspondence between them. That is, when the electromagnet 402 is activated, it attracts the magnetic object 408, but does not substantially attract the other magnetic objects, or attracts them to a significantly lesser extent. Similarly, when the electromagnet 404 is activated, it attracts the magnetic object 410, while not significantly (or to a significantly lesser extent) attracting the other magnetic objects. And when the electromagnet 406 is activated, it attracts the magnetic object 412, while not significantly (or to a significantly lesser extent) attracting the other magnetic objects.

It will be appreciated that when a given electromagnet is activated, the attraction of the corresponding magnetic object will exert pressure on that portion of the user's hand. The electromagnets and magnetic objects may in some embodiments correspond to the phalanges of the finger. That is, when the electromagnet 402 is activated, then pressure is exerted on the distal phalanx of the user's index finger. When the electromagnet 404 is activated, then pressure is exerted on the intermediate phalanx of the user's index finger; and when the electromagnet 406 is activated, then pressure is exerted on the proximal phalanx of the user's index finger.

It will be appreciated that the electromagnets may be selectively activated to simulate different kinds of haptic feedback. Furthermore, the amount of power applied to a given electromagnet may be varied to provide for a desired amount of pressure to be exerted on a portion of the user's hand. For example, if only the tip of the index finger of a corresponding virtual hand is touching a virtual object in a virtual environment, then the electromagnet 402 can be selectively activated to provide a haptic feedback effect of pressure at the tip of the index finger (distal phalanx) that simulates the feeling of touching an object with the user's index finger. Furthermore, the amount of pressure felt can be varied by increasing or decreasing the amount of power applied to the electromagnet 402 to, for example, simulate pressing harder or lighter, respectively, on the virtual object with the index finger of the virtual hand.

It should be appreciated that though the present configuration is described with respect to the index finger portion of the glove interface object 104, a similar configuration may be provided for the other fingers of the glove interface object 104, including the thumb, middle, ring, and pinky finger portions of the glove interface object. Further, similar configurations of electromagnets and corresponding magnetic objects can be provided on the palm portion of the glove interface object.

For purposes of the present disclosure, a magnetic object is an object that is capable of being attracted by an electromagnet when activated. A magnetic object does not necessarily exhibit a magnetic field in isolation, but reacts in the presence of an applied magnetic field. In the present embodiment, each of the magnetic objects can be defined to include a magnetic material that is capable of being attracted by an electromagnet when activated. It will be appreciated that the magnetic objects may have any of various configurations and be composed of any materials that provide for the magnetic object to be attracted to a corresponding electromagnet when the electromagnet is activated (when current/power is applied to the electromagnet). In some implementations, the magnetic object is defined to include at least one ferromagnetic material (e.g. iron, nickel, cobalt, and alloys thereof).

In some implementations, the magnetic object is defined as a sealed pouch containing a powder of a magnetic material. In other implementations, the magnetic object is defined as a strip, piece, bit, or other portion of a magnetic material. It will be appreciated that a portion of a magnetic material may be attached to the glove interface object by any suitable technique, including, without limitation, by glue, adhesive, being sewn into a fabric pouch, etc. Additionally, though in the illustrated embodiment, a single magnetic object is defined corresponding to a single electromagnet, there may be multiple magnetic objects which are configured to be attracted to a given electromagnet when activated. By way of example, with continued reference to FIG. 4A, the magnetic object 408 could be substituted for a plurality of magnetic objects located on the palmar side of the distal phalanx portion of the glove interface object. Such a configuration may provide for greater flexibility of the glove interface object in the regions which include the magnetic objects, thereby allowing the glove interface object to more easily conform to the shape of a given user's finger/hand.

The glove interface object 104 includes a controller 414 that is configured to control the activation/deactivation and level/strength of activation of the electromagnets. The controller 414 may be configured to receive haptic feedback data from an external device (e.g. gaming console) that defines the activation/deactivation and level/strength of activation of the electromagnets. In one embodiment, the haptic feedback data is generated by a computing device (e.g. game console, computer, etc.) that executes an interactive application defining a virtual environment including one or more virtual objects. The glove interface object 104 may be utilized to control a virtual hand in the virtual environment, and the haptic feedback data can be generated based on interactions of the virtual hand with the virtual objects. The haptic feedback data can define the activation/deactivation and level/strength of activation of the electromagnets, so as to provide the user a feeling In some implementations, the controller 414 may be defined at/on a bracelet or wrist portion 416 that is defined as part of the glove interface object 104. However, it should be appreciated that in other implementations, the controller 414 may be defined at any other location on the glove interface object 104 (e.g. on the dorsal side of the palm portion).

Figure 4B:
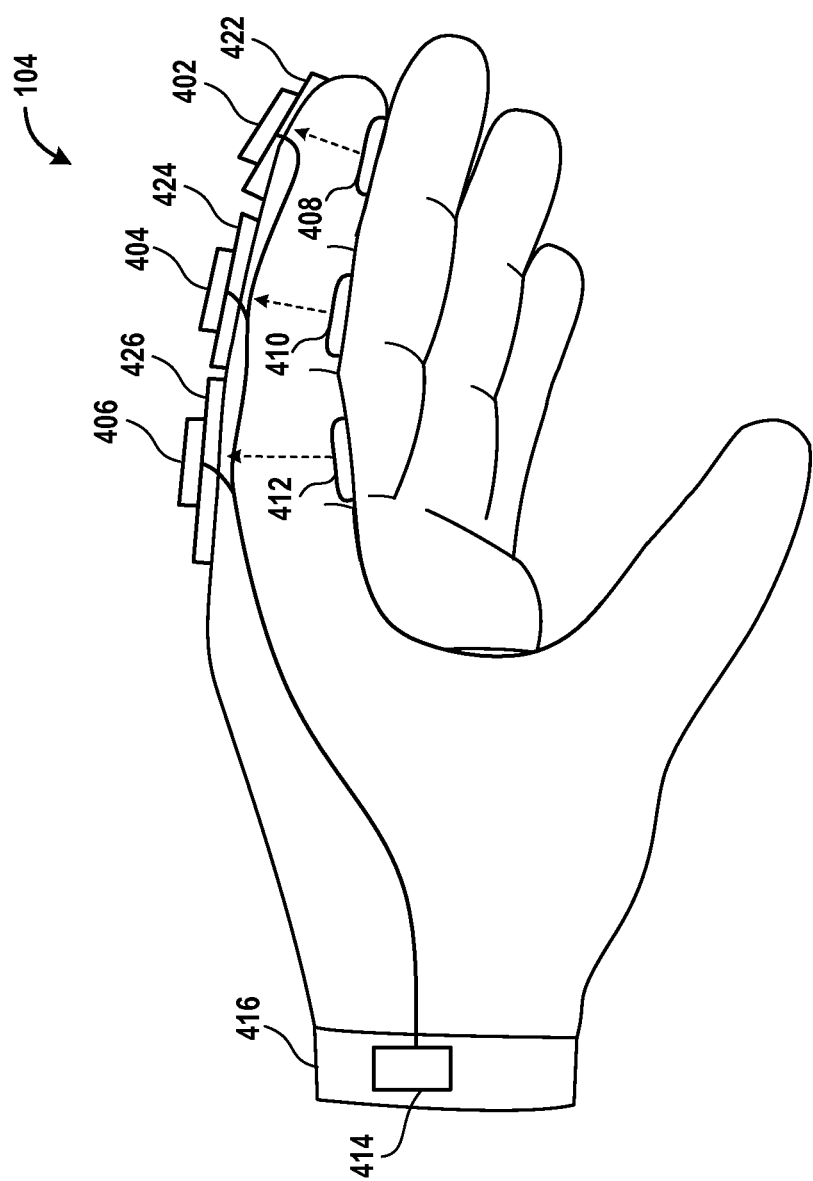
FIG. 4B illustrates a glove interface object for providing haptic feedback, in accordance with an embodiment of the invention.

FIG. 4B illustrates a glove interface object for providing haptic feedback, in accordance with an embodiment of the invention. The embodiment of FIG. 4B is similar to that of FIG. 4A, but additionally includes mounting structures 422, 424, and 426, on which the electromagnets 402, 404, and 406 are respectively mounted. The mounting structures 422, 424, and 426 can be defined from a rigid or semi-rigid material (e.g. a plastic material), and each mounting structure is configured to be disposed between its respective electromagnet and the user's hand. The mounting structures serve to reduce the perceived pressure on the back of the hand when the electromagnets are activated. For a given electromagnet, the mounting structure provides a larger area over which the force exerted by the electromagnet against the hand will be spread/dissipated.

Figure 5B:
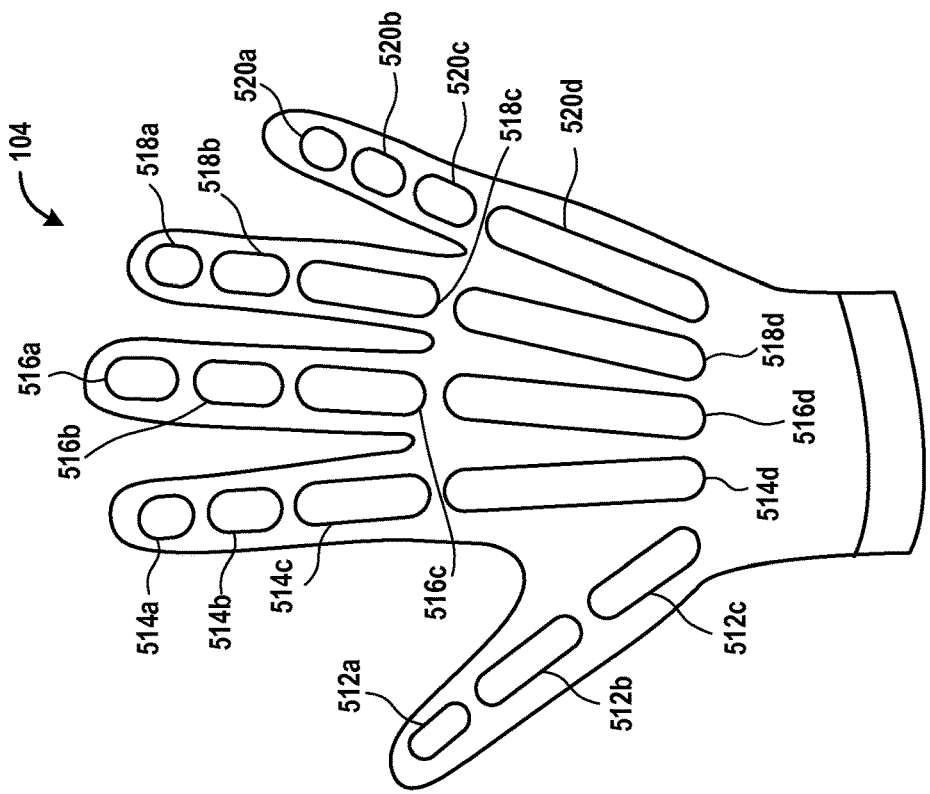
FIG. 5B illustrates the palmar side of the glove interface object 104, in accordance with the embodiment of FIG. 5A.
Figure 5A:
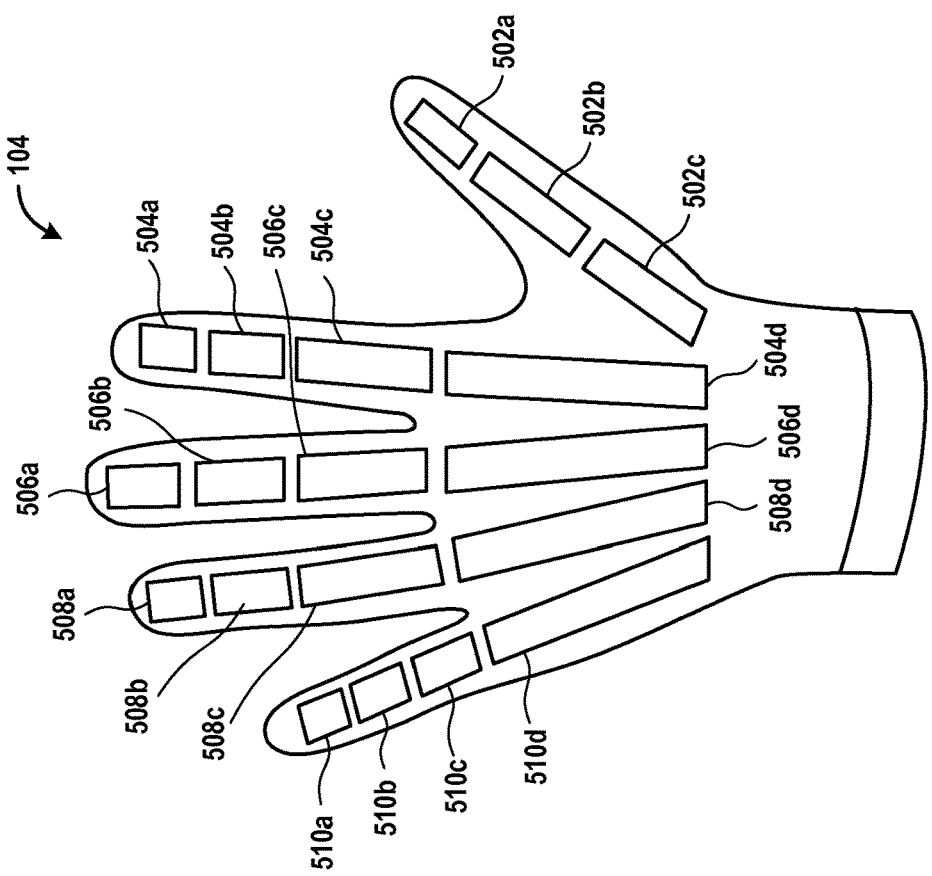
FIG. 5A illustrates the dorsal side of a glove interface object for providing haptic feedback, in accordance with an embodiment of the invention.

FIG. 5A illustrates the dorsal side of a glove interface object for providing haptic feedback, in accordance with an embodiment of the invention. The glove interface object 104 is shown to include a plurality of electromagnets that are positioned on the dorsal/back side of the glove interface object and configured to correspond to the various segments of the user's hand.

The electromagnets 502a and 502b are defined along the distal phalanx and proximal phalanx, respectively, of the thumb portion of the glove interface object 104. The electromagnets 504a, 504b, and 504c, are defined along the distal phalanx, intermediate phalanx, and proximal phalanx, respectively, of the index finger portion of the glove interface object 104. The electromagnets 506a, 506b, and 506c, are defined along the distal phalanx, intermediate phalanx, and proximal phalanx, respectively, of the middle finger portion of the glove interface object 104. The electromagnets 508a, 508b, and 508c, are defined along the distal phalanx, intermediate phalanx, and proximal phalanx, respectively, of the ring finger portion of the glove interface object 104. The electromagnets 510a, 510b, and 510c, are defined along the distal phalanx, intermediate phalanx, and proximal phalanx, respectively, of the pinky/little finger portion of the glove interface object 104. The electromagnets 502c, 504d, 506d, 508d, and 510d are defined along the metacarpal portions of the glove interface object (so as to be positioned on the back of the hand).

FIG. 5B illustrates the palmar side of the glove interface object 104, in accordance with the embodiment of FIG. 5A. Shown at FIG. 5B are a plurality of magnetic objects defined on the palmar/anterior/front side of the glove interface object. Each of the magnetic objects corresponds to one of the electromagnets, and is configured to be attracted to its corresponding electromagnet when the corresponding electromagnet is activated.

The magnetic objects 512a and 512b are defined along the distal phalanx and proximal phalanx, respectively, of the thumb portion of the glove interface object 104 (and correspond to the electromagnets 502a and 502b, respectively). The magnetic objects 514a, 514b, and 514c, are defined along the distal phalanx, intermediate phalanx, and proximal phalanx, respectively, of the index finger portion of the glove interface object 104 (and correspond to the electromagnets 504*a*, 502*b*, and 504*c*, respectively). The magnetic objects 516*a*, 516*b*, and 516*c*, are defined along the distal phalanx, intermediate phalanx, and proximal phalanx, respectively, of the middle finger portion of the glove interface object 104 (and correspond to the electromagnets 506*a*, 506*b*, and 506*c*, respectively). The magnetic objects 518*a*, 518*b*, and 518*c*, are defined along the distal phalanx, intermediate phalanx, and proximal phalanx, respectively, of the ring finger portion of the glove interface object 104 (and correspond to the electromagnets 508*a*, 508*b*, and 508*c*, respectively). The magnetic objects 520*a*, 520*b*, and 520*c*, are defined along the distal phalanx, intermediate phalanx, and proximal phalanx, respectively, of the pinky/little finger portion of the glove interface object 104 (and correspond to the electromagnets 510*a*, 510*b*, and 510*c*, respectively). The magnetic objects 512*c*, 514*d*, 516*d*, 518*d*, and 520*d* are defined along the metacarpal portions of the glove interface object (so as to be positioned on the front of the palm of the hand) (and correspond to the electromagnets 502*c*, 504*d*, 506*d*, 508*d*, and 510*d*, respectively).

Figure 6B:
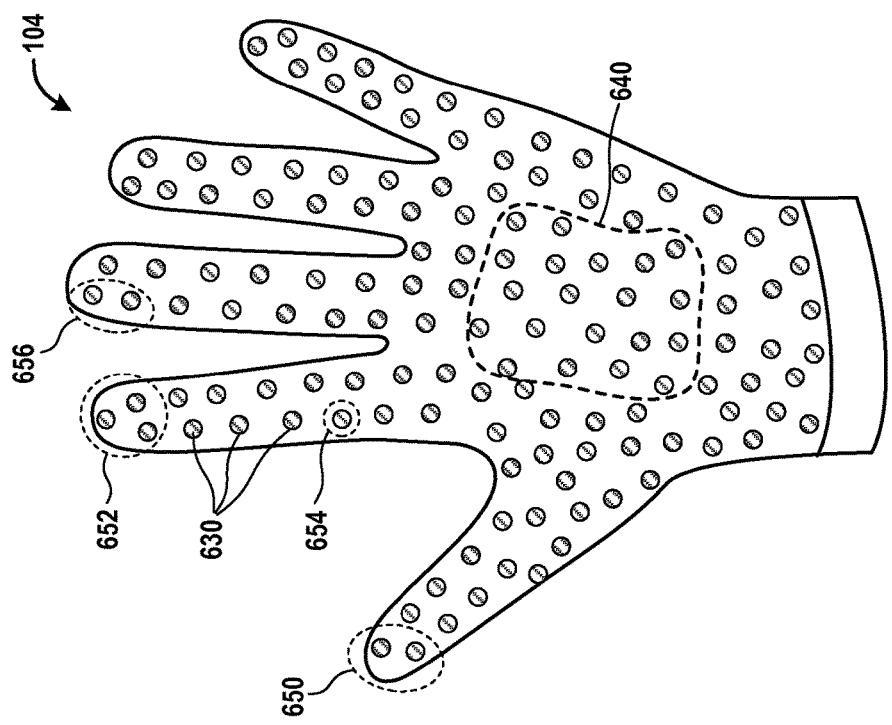
FIG. 6B illustrates the palmar side of the glove interface object 104, in accordance with the embodiment of FIG. 6A.
Figure 6A:
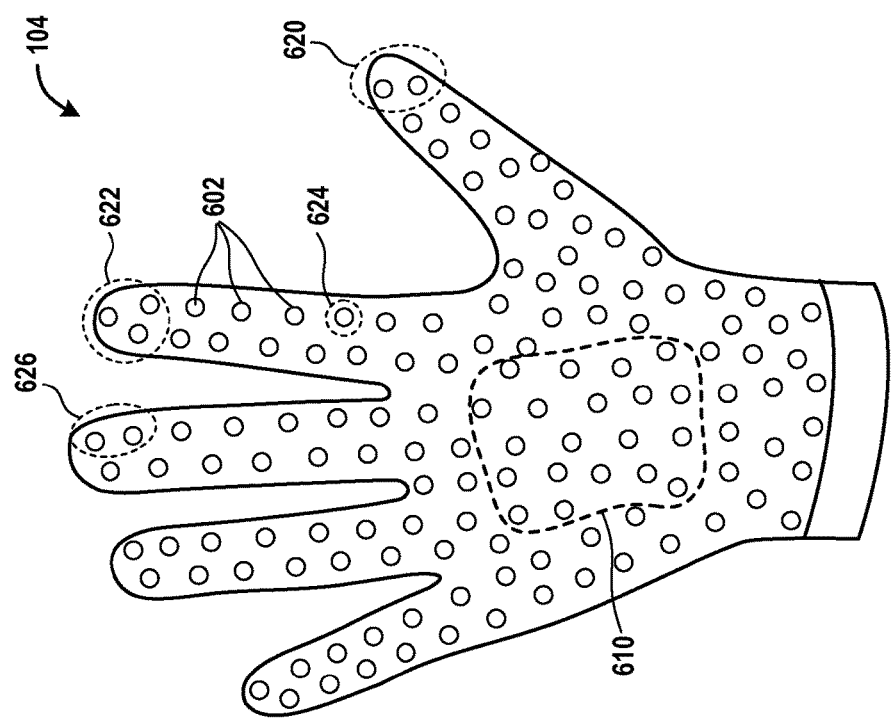
FIG. 6A illustrates a dorsal side of a glove interface object, in accordance with an embodiment of the invention.

FIG. 6A illustrates a dorsal side of a glove interface object, in accordance with an embodiment of the invention. As shown, the glove interface object 104 includes a plurality of electromagnets 602 which are distributed throughout the dorsal side of the glove interface object. The operation of each of the electromagnets can be controlled by a controller to provide for selective activation of specific ones of the electromagnets.

FIG. 6B illustrates the palmar side of the glove interface object 104, in accordance with the embodiment of FIG. 6A. As shown at FIG. 6B, there are a plurality of magnetic objects 630 positioned on the palmar side of the glove interface object. Each of the magnetic objects 630 corresponds to one of the electromagnets 602, and is configured to be attracted to its corresponding electromagnet when activated.

By controlling the selective activation and strength of activation of the electromagnets, it is possible to provide for haptic feedback in the form of pressure applied to specific parts of the user's hand. Such haptic feedback can, for example, mimic the effect of touching an object, so that a user controlling a virtual hand to touch a virtual object may experience a sensation of feeling the virtual object being touched with his/her own hand.

By way of example, if a virtual object is resting in or otherwise touching the palm of the virtual hand, then the electromagnets in the region 610 (FIG. 6A) may be activated. The electromagnets in the region 610 are positioned to attract corresponding magnetic objects 640 that are positioned on the palmar side of the glove interface object in the palm of the glove. In this manner, the user will feel pressure exerted on the palm of his/her hand.

As another example, if a virtual object such as a virtual pen or pencil is held by the virtual hand, then the electromagnets in the regions 620, 622, 624, and 626 may be activated, attracting corresponding magnetic objects in the regions 650, 652, 654, and 656. In this manner, the user will feel pressure exerted in these regions, which are configured to be regions at which a user would normally feel contact when holding a pen or pencil in their hand.

FIG. 6C illustrates the palmar side of the glove interface object 104, in accordance with an embodiment of the invention. In the illustrated embodiment, the bottom/palmar side of the glove is defined from a magnetic thread or fabric. To achieve a magnetic thread/fabric, the thread/fabric can be constructed so as to incorporate a magnetic material. For example, the thread/fabric may be coated with a magnetic material, e.g. a powder coating of magnetic particles that adhere to the thread/fabric via an adhesive material. In some embodiments, magnetic material may be dispersed within a flexible material formed in a layer and adhered to the glove. In some implementations, magnetic material may be sandwiched between layers of fabric and/or other materials to provide for improved durability and wear.

FIG. 6D illustrates a magnified view of a portion of a magnetic fabric, in accordance with an embodiment of the invention. The magnetic fabric is defined from various threads 660 which have been interwoven together. Attached to certain ones of the threads 660 are magnetic particles 662. It will be appreciated that the density of the magnetic particles 662 within different regions of the fabric can be varied to define regions of higher density which react to apply greater force on a user's hand when the electromagnets are activated, and regions of lower density which react to apply comparatively lesser force when the electromagnets are activated.

FIG. 6E illustrates a portion of a magnetic fabric, in accordance with an embodiment of the invention. In the illustrated embodiment, the magnetic fabric is defined from elastic fibers 670, which include magnetic particles 672. The magnetic particles 672 may be adhered to the elastic fibers 670 by an adhesive, or otherwise included in the elastic fiber weave. The elastic fibers 670 may be joined by additional stitching 674 to define the magnetic fabric. It will be appreciated that the density/distribution of the magnetic particles along the elastic fibers can be varied to achieve a desired distribution of magnetic material over various regions of the magnetic fabric.

Figure 7A:
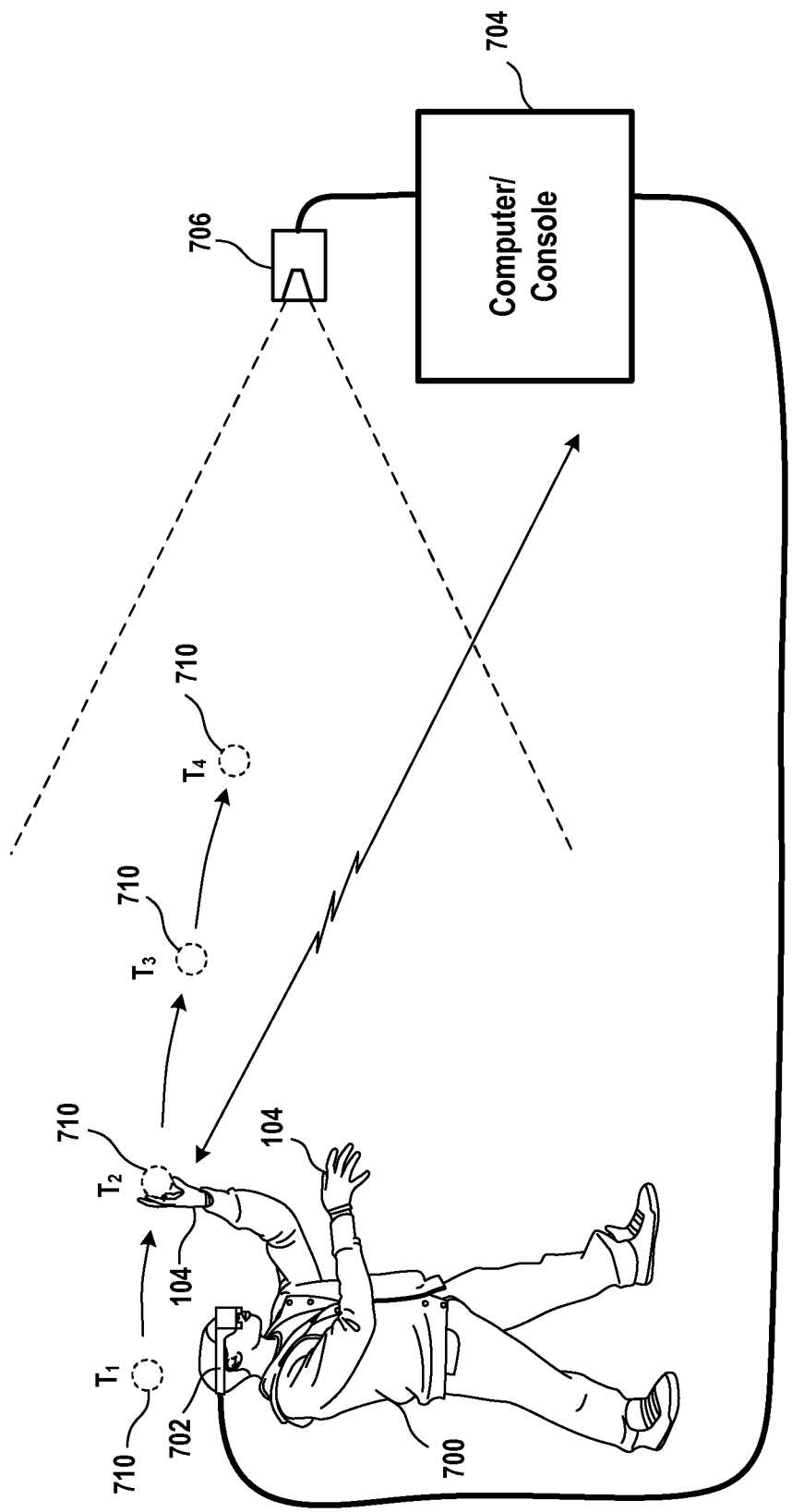
FIG. 7A illustrates a user interacting with an interactive application in an interactive environment, in accordance with an embodiment of the invention.

FIG. 7A illustrates a user interacting with an interactive application in an interactive environment, in accordance with an embodiment of the invention. As shown, the user 700 is wearing a head-mounted display 702 that is configured to receive a video feed from a computer/console device 704. The computer 704 executes an interactive application that generates a virtual environment in which the user is able to interact. The executing interactive application generates the video feed that when rendered on the HMD, presents a view of the virtual environment to the user 700. The user 700 is also wearing a glove interface object 104 that is configured to provide haptic pressure feedback in accordance with the devices and techniques discussed elsewhere herein. In the illustrated embodiment, an image capture device 706 is configured to capture images of the interactive environment, including images of the user 700, the HMD 702, and the glove interface object 104.

The location/orientation of the glove interface object 104, the user 700, and the HMD 702 can be determined and tracked, at least in part, based on the captured images of the interactive environment. Additionally, inertial sensors disposed in the HMD 702 and/or the glove interface object 104 can be utilized for determining and tracking location/orientation. It will be appreciated that the specific location/orientation and particular pose of the glove interface object 104 can be utilized to determine the location/orientation and pose of a virtual hand in the virtual environment. In this manner, the user 700 may intuitively interact with objects in the virtual environment through control of the virtual hand that responds in a similar manner to the real-world motions of the user's actual physical hand.

With continued reference to FIG. 7A, the user 700 is shown throwing a virtual object 710, which may be a virtual ball, for example. It will be appreciated that the user 700 is not holding an actual physical ball, but is nonetheless receiving haptic feedback via the glove interface object that simulates the feeling of holding and throwing the virtual ball 710. The haptic feedback may be physically instantiated by the glove interface object 104 upon receipt of haptic feedback data that is generated by the interactive application executing on the computer/console 704.

As shown in the illustrated embodiment, the virtual ball 710 moves through various positions in the virtual environment as it is thrown. It will be appreciated that the movement of the virtual ball 710 in the virtual environment has been superimposed in FIG. 7A (which otherwise portrays a real-world interactive environment) to give a sense of how the user 700 may experience the sensation of actually throwing a ball.

Figure 8:
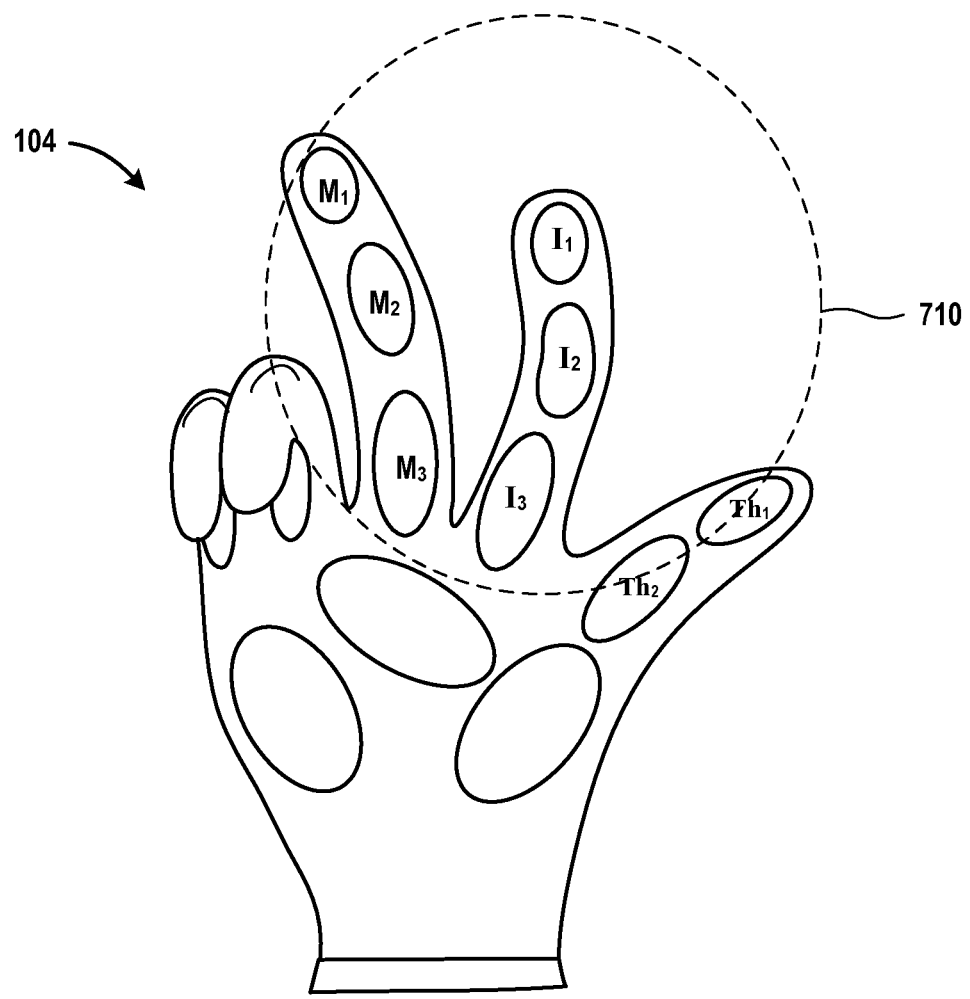
FIG. 8 illustrates a close-up view of the palmar side of a glove interface object, showing magnetic objects which are attracted by corresponding electromagnets that are selectively activated to simulate the feeling of holding a ball, in accordance with the embodiment of FIG. 7A.

As has been described previously, a glove interface object 104 may be configured to selectively provide pressure on specified locations of the hand. For example, the user 700 might hold the virtual ball 710 with the thumb, index finger, and middle finger of the hand, and thus it is desirable to provide for haptic feedback that mimics the sensation of holding a ball with those three fingers. FIG. 8 illustrates a close-up view of the palmar side of the glove interface object 104, showing magnetic objects which are attracted by corresponding electromagnets that are selectively activated to simulate the feeling of holding a ball, in accordance with the embodiment of FIG. 7A. As shown at FIG. 8, the magnetic objects $Th_1$ and $Th_2$ on the thumb portion, $I_1$, $I_2$, and $I_3$ on the index finger portion, and $M_1$, $M_2$, and $M_3$ on the middle finger portion of the glove interface object, are attracted by corresponding electromagnets that are selectively activated to provide the sensation of the ball touching the user's hand.

Figure 9:
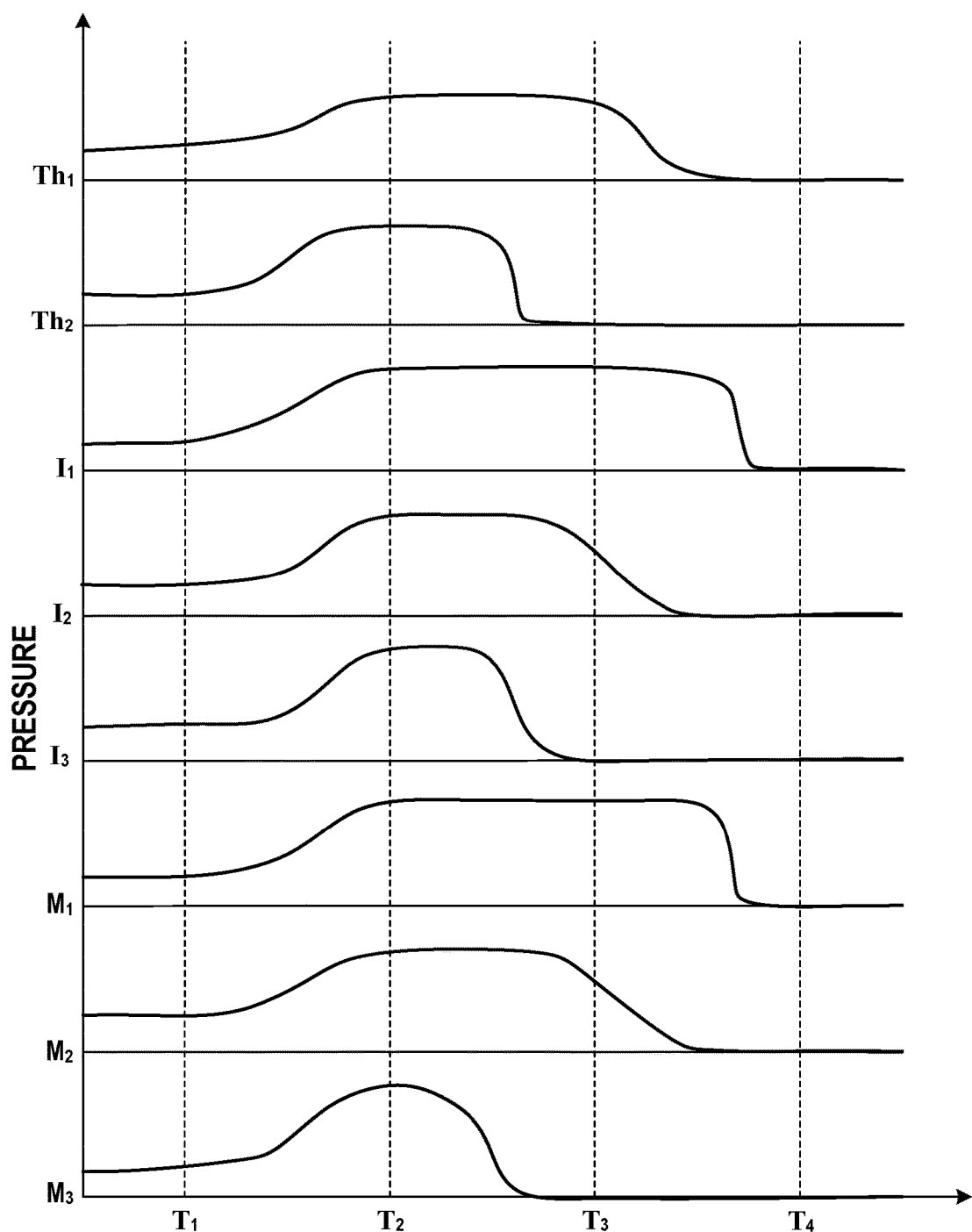
FIG. 9 is a graph illustrating pressure exerted by the magnetic objects over time, in accordance with the embodiments of FIGS. 7A and 8.

In addition to the activation of electromagnets to provide the sensation of the ball touching the user's hand, the specific pressure by any given magnetic object, as determined from the strength/power of activation of the corresponding electromagnet, may be dynamically configured to change over time in accordance with the modeled interaction of the virtual ball/object with the virtual hand that is controlled by the user. FIG. 9 is a graph illustrating pressure exerted by the magnetic objects over time, in accordance with the embodiments of FIGS. 7A and 8. It should be appreciated that the pressure exerted by the magnetic objects shown at FIG. 9 results from and is positively correlated to the strength of activation (amount of power applied to) the corresponding electromagnets which are configured to respectively attract the magnetic objects.

At time $T_1$, as shown at FIG. 7A, the user 700 is holding the virtual ball 710 over his head in preparation to throw the virtual ball 710. As indicated at FIG. 9, at time $T_1$, the pressure exerted by the magnetic objects $Th_1$ and $Th_2$ on the thumb portion, $I_1$, $I_2$, and $I_3$ on the index finger portion, and $M_1$, $M_2$, and $M_3$ on the middle finger portion of the glove interface object, is at an initial level. At time $T_2$, as shown at FIG. 7A, the user 700 is making a throwing motion and thereby accelerating the virtual ball 710 in a forward direction. Consequently, as indicated at FIG. 9, at time $T_2$, the pressure exerted by the magnetic objects $Th_1$, $Th_2$, $I_1$, $I_2$, $I_3$, $M_1$, $M_2$, and $M_3$, is increased to simulate the feeling of accelerating the virtual ball 710.

At time $T_3$, as shown at FIG. 7A, the user 700 is continuing to throw the virtual ball 710, but the virtual ball 710 is beginning to release from the user's hand. Consequently, as indicated at FIG. 9, between time $T_2$ and $T_3$, the pressure exerted by magnetic objects $Th_2$, $I_3$, and $M_3$ are reduced as the virtual ball rolls off the user's hand. And at time T3, the pressure exerted by magnetic objects $I_2$ and $M_2$ is in the process of being reduced. Following time $T_3$, the pressure exerted by magnetic objects $Th_1$, $I_1$, and $I_3$ are reduced as the virtual ball 710 is released from the fingertips of the user's hand. By time T4, the pressure exerted by each of the magnetic objects has been reduced, as the virtual ball 710 has been released from the user's hand.

As will be appreciated from the foregoing example of a virtual ball being thrown, the activation and level of strength of the various electromagnets can be controlled to provide a real-time simulated feeling of an interaction with a virtual object. The physics of interactions (e.g. touching, holding, accelerating, decelerating, moving, throwing, grasping, releasing, picking up, pressing, etc.) between the user's hand and a virtual object can be modeled to determine the instantaneous pressure exerted on the various portions of the user's hand by the virtual object over time. Haptic feedback data can therefore be generated based on this information to control the electromagnets of the glove interface object so as to provide a similar sensation to the user.

It should be appreciated that the foregoing example of a user throwing a virtual ball is provided by way of example only, without limitation. It will be appreciated that in various embodiments, practically any type of physical interaction between the user's hand and one or more virtual objects can be modeled and haptic feedback can be generated to provide for the sensation of such a physical interaction in real-time. In another specific example, a user may move his hand along a surface, and the texture of the surface may be felt through the haptic feedback mechanisms disclosed herein. It should be appreciated that interactions with virtual objects may include interactions between virtual avatars of different users. For example, the pressure felt during a handshake between two people can be simulated so that the users may feel the sensation of the handshake.

Figure 7B:
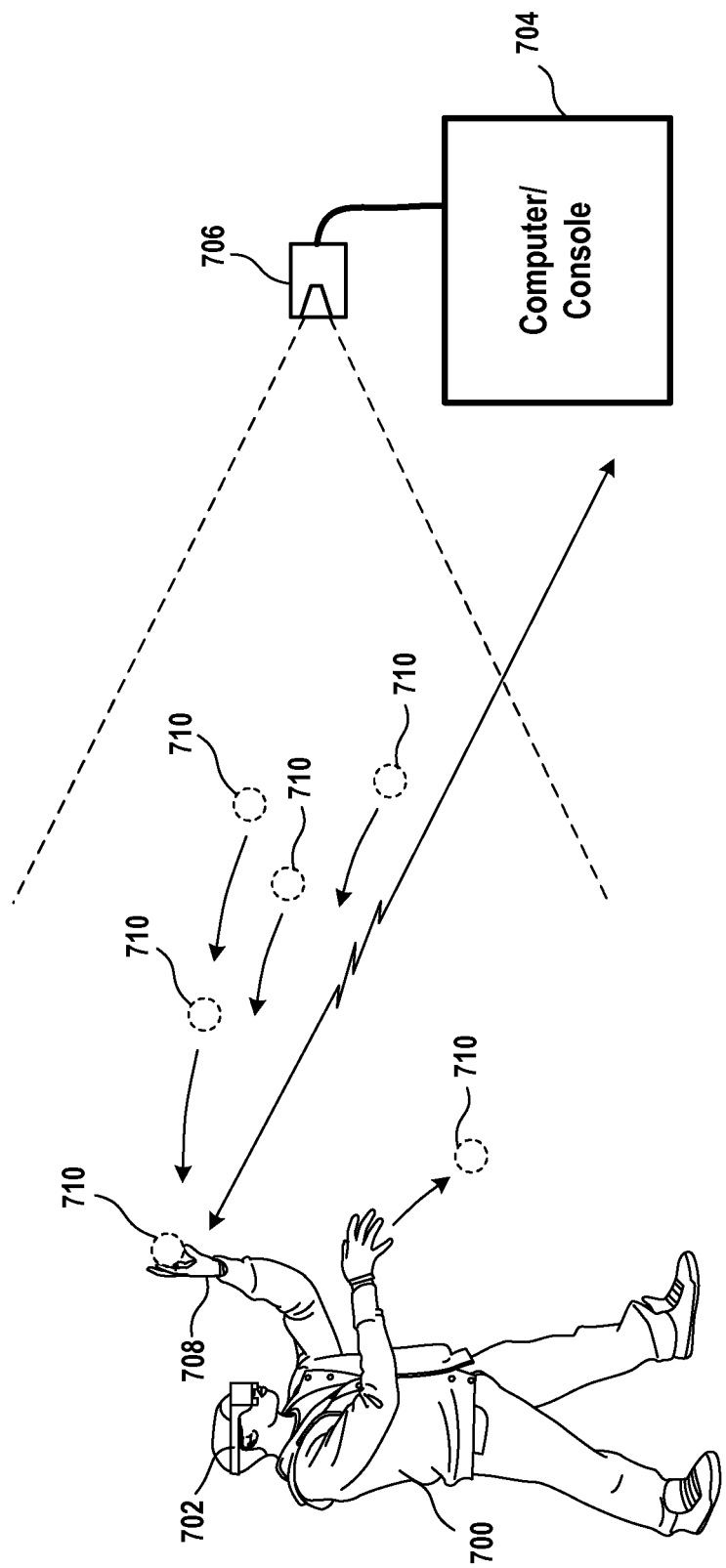
FIG. 7B illustrates a user blocking/catching virtual objects, in accordance with an embodiment of the invention.

FIG. 7B illustrates a user blocking/catching virtual objects, in accordance with an embodiment of the invention. The user 700 views the virtual environment through HMD 702, and sees virtual objects 710 coming towards him. When a virtual object "contacts" the user's hand, the user is able to feel the sensation of pressure on his hand via the haptic feedback mechanisms provided through glove interface objects as described above, thus mimicking the sensation of catching/blocking a real object. When a virtual object is "released" from the user's hand, the haptic feedback pressure may also be released.

Throughout the present disclosure, embodiments have been described having electromagnets positioned on the dorsal side of the glove interface object, and magnetic objects positioned on the palmar side of the glove interface object. However, in alternative implementations, the electromagnets can be positioned on the palmar side of the glove interface object, while the magnetic objects are positioned on the dorsal side of the glove interface object.

Additionally, while in certain embodiments, a single electromagnet is configured to attract a single magnetic object, in other embodiments, a single electromagnet may be configured to attract multiple magnetic objects, or multiple electromagnets may be configured to attract the same magnetic object. It will be appreciated that there may be overlap with respect to the correlation between the electromagnets and the magnetic objects.

Additionally, embodiments have been described with reference to a head-mounted display. However, it should be appreciated that in other embodiments, non-head mounted displays may be substituted, such as a television, projector, LCD display screen, portable device screen (e.g. tablet, smartphone, laptop, etc.) or any other type of display that can be configured to render video in accordance with the present embodiments of the invention.

Though embodiments have been described with reference to electromagnets, in some implementations, electro-permanent magnets (semi-permanent electromagnets) may be substituted. Electro-permanent magnets may provide advantages by utilizing lower power and therefore producing less heat.

Figure 10A:
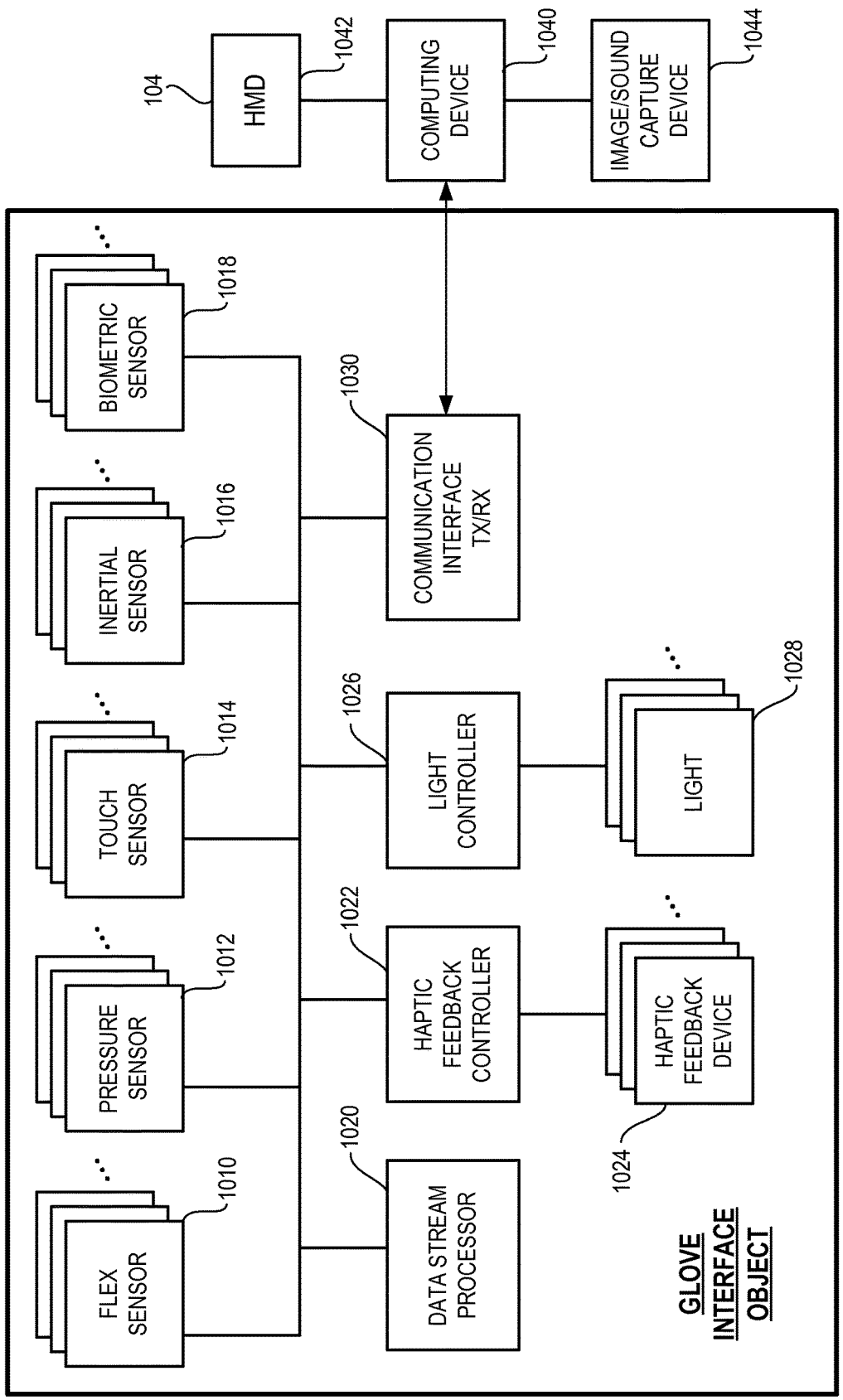
FIGS. 10A and 10B schematically illustrate a system for interfacing with an interactive application using a glove interface object, in accordance with an embodiment of the invention.

FIG. 10A schematically illustrates a system for interfacing with an interactive application using a glove interface object, in accordance with an embodiment of the invention. The glove interface object 104 includes flex sensors 1010, pressure sensors 1012, touch switches 1014, inertial sensors 1016, and biometric sensors 1018. A data stream processor 1020 is configured to process data from the various sensors. It will be appreciated that in various embodiments, the data stream processor 1020 may process sensor data to various extents, including determining values quantifying sensed activity, identifying poses, gestures, movements, etc. A haptic feedback controller 1022 is configured to control the operation of haptic feedback devices 1024. A light controller 1026 is configured to control the operation of lights 1028. A communications interface is configured to communicate data to/from other devices.

The haptic feedback devices 1024 can include the electromagnets which are configured to attract respective magnetic objects, as described in the present disclosure. The haptic feedback controller 1022 can be configured to receive data defining the activation/deactivation (on/off state) and the level/strength of activation of the electromagnets.

A computing device 1040 is configured to execute a video game, and communicate with the glove interface object 104. The video game is rendered on an display/HMD 1042. An image/sound capture device 1044 captures images and sound from the interactive environment in which the user is situated. It should be appreciated that the computing device 1040 receives data from the glove interface object such as sensor data, and the computing device may also generate commands to control the operation of the various devices of the glove interface object 104, to effect the functionality of the glove interface object discussed herein.

Figure 10B:
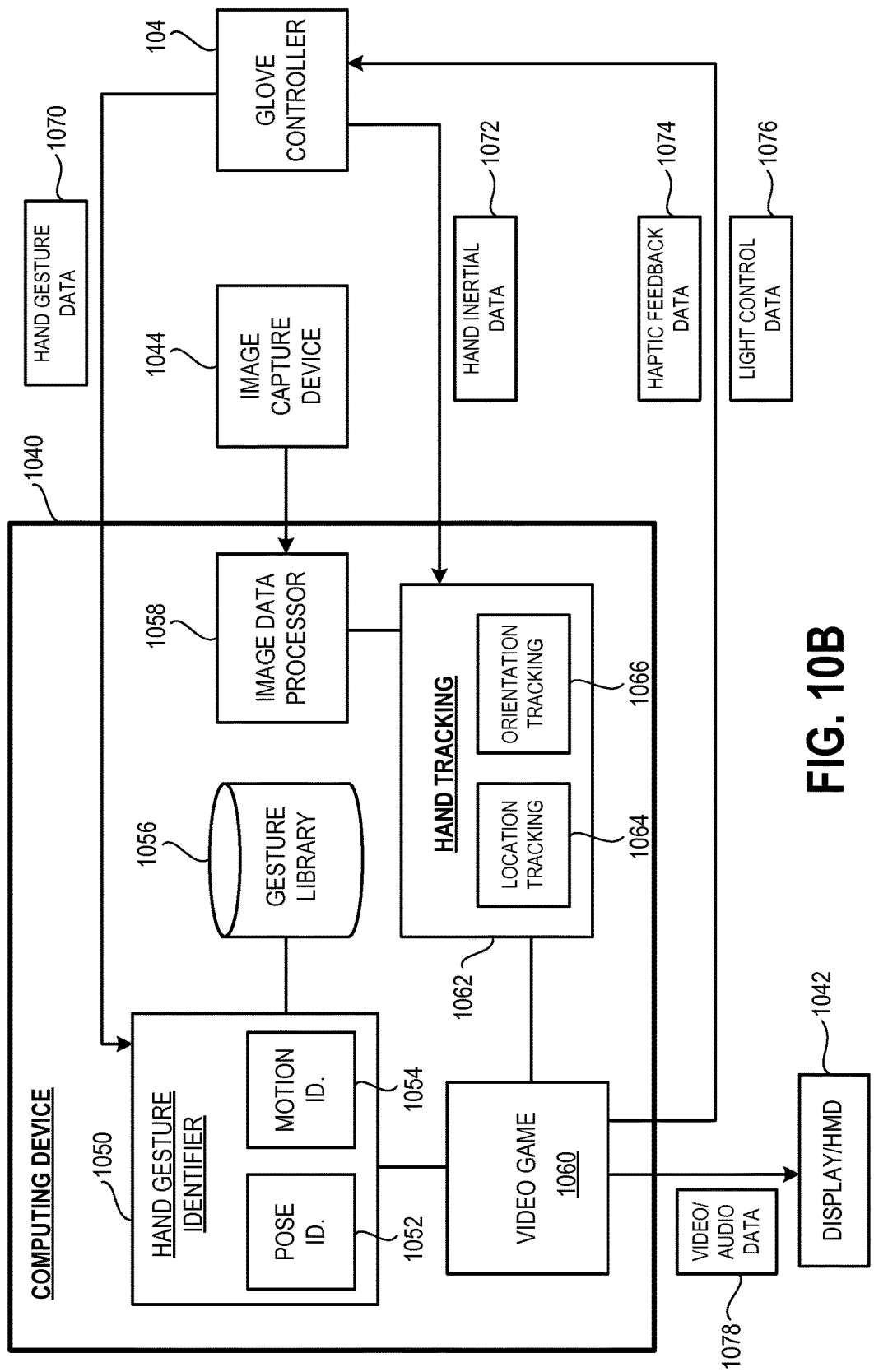

FIG. 10B illustrates additional components of the computing device 1040, in accordance with an embodiment of the invention. The glove interface object 104 provides hand gesture data, detected/processed from the glove interface object's various sensors, to a hand gesture identifier 1050. The hand gesture identifier 1050 can define a hand pose identifier 1052 for identifying a pose of the user's hand, and a hand motion identifier 1054 for identifying dynamic movements of the user's hand, such as motion and/or changes in the pose of the user's hand. These define gestures detected from the glove interface object 104 that are supplied to a video game 1060 as input. In one embodiment, a gesture library 1056 is provided, containing reference data defining various gestures, which may be utilized to identify gestures for the video game.

An image data processor 1058 processes images captured by the image capture device 1044, to identify trackable objects such as lights on the glove interface object 104. The hand tracking processor 1062 is configured to perform location tracking 1064 and orientation tracking 1066 of the hand of the user, based on the identified trackable objects as well as inertial data 1072 from the glove interface object 104. The location and orientation of the glove interface object (as defined by the user's hand) may also be provided as input to the video game 1060. The video game 1060 may generate haptic feedback data 1074 for transmission to the glove interface object 104, which thereby produces the haptic feedback. The video game 1076 may also generate light control data 1076 for controlling the lights on the glove interface object 104. Additionally, the video game 1060 generates video/audio data 1078 for rendering by the display/HMD 1042.

In some embodiments, the glove interface object is defined by an inner glove and an outer glove. The inner glove is removable and washable, whereas the outer glove contains the hardware for the glove interface object's functionality as described herein. Additionally, the inner glove may function as an insulator to insulate the hardware of the glove interface object from the user.

In some embodiments, haptic feedback can be provided by vibrating the fingertips at various frequencies to simulate textures as a user moves his fingers along a surface.

In some embodiments, force feedback mechanisms can be included in the glove interface object. Devices can be included which oppose motions of the user's hands/fingers, to simulate resistance encountered when making such motions. For example, a force feedback mechanism may oppose the motion of closing one's fingers, thus simulating the feel for grabbing/holding an object.

In some embodiments, pressure feedback mechanisms can be provided which apply pressure to at least a portion of the hand as a feedback mechanism. For example, a clamp may squeeze a finger as feedback, e.g. when touching a virtual object.

It should be appreciated that the input provided by the glove interface object can be applied to provide real-time control of a virtual hand or other object in a virtual environment. In some embodiments, the input provided by the glove interface object provides control of a non-hand-like object in the virtual environment, such as enabling manipulation of the object. In some embodiments, the input provided by the glove interface object provides real-time control of an arm or hand-like object of a character that is controlled by the user. When utilized in the context of presentation on an HMD device, the glove interface object can provide a highly immersive and intuitive experience with respect to control of an arm/hand or similar appendage of a character in the virtual environment. That is, the user can experience a sensation as if the virtual arm/hand or appendage really is their own arm/hand, resulting from the real-time control and responsiveness afforded by the glove interface object in combination with the highly immersive presentation of the HMD device.

Furthermore, it will be appreciated that within an interactive session of an interactive application, the virtual hand may be shown or not shown depending upon the execution state of the interactive application. For example, in a video game, there may be various stages/scenes/tasks/levels/etc. that may or may not require the virtual hand to be shown. Furthermore, the rendering of the virtual hand may be shown or not shown in the virtual environment depending upon the context or content of the virtual environment. For example, the virtual hand might be shown (or made available to be shown) when a specific object is present in the virtual scene, or when the user approaches the specific object to manipulate it or otherwise interact with it.

In some implementations, the pose and/or movement of the user's hand/fingers can define a gesture that can be identified from tracking the glove interface object in accordance with the principles discussed herein. The identified gesture can be configured to cause some action in the virtual environment—that is, the gesture is recognized and correlated to a produce a specific input for the interactive application that is generating the virtual environment. In various embodiments, a virtual hand may or may not be shown in conjunction with the gesture identification.

Figure 11:
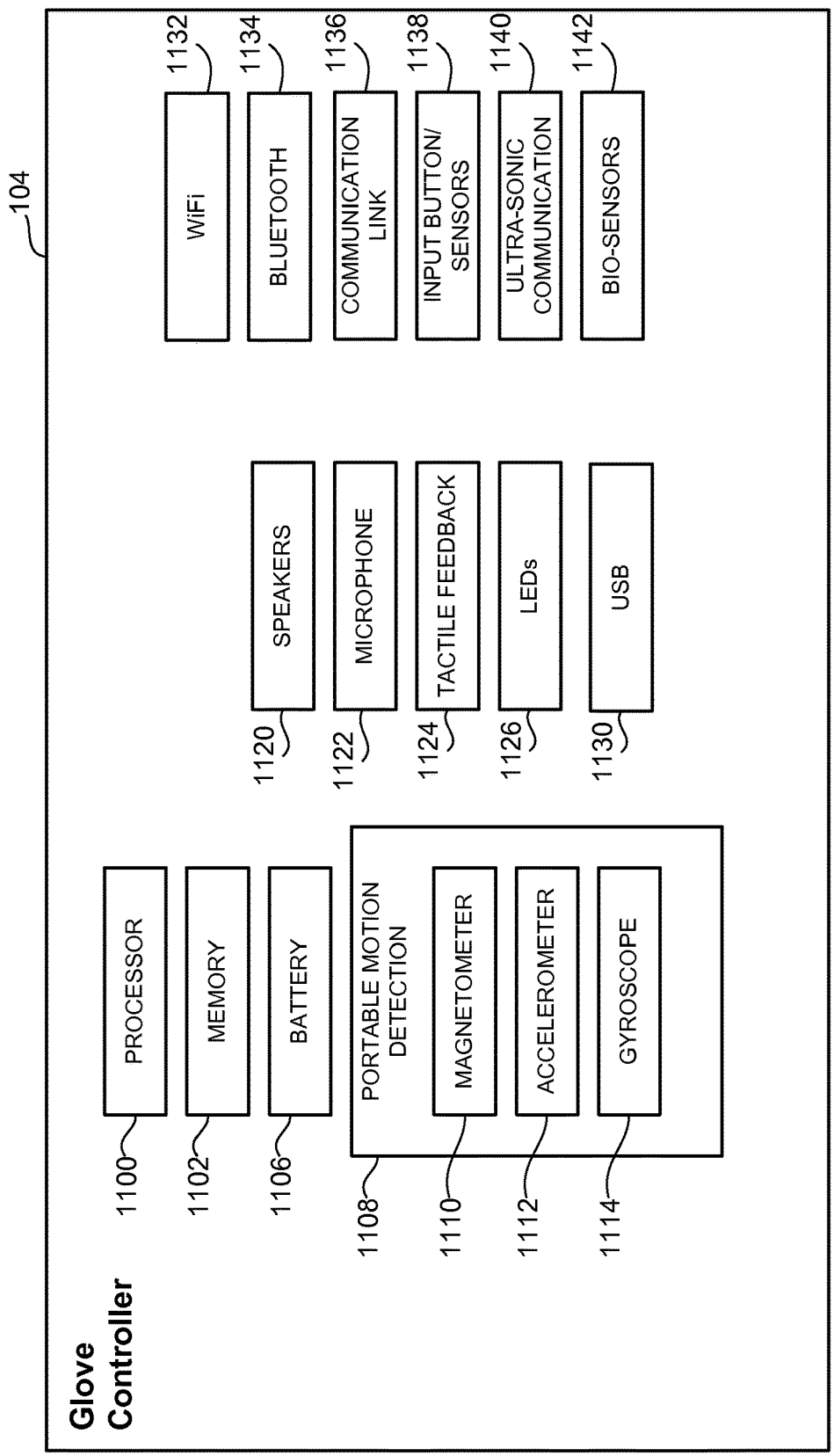
FIG. 11 illustrates components of a glove interface object, in accordance with an embodiment of the invention.

With reference to FIG. 11, a diagram illustrating components of a glove interface object 104 is shown, in accordance with an embodiment of the invention. The glove interface object 104 includes a processor 1100 for executing program instructions. A memory 1102 is provided for storage purposes, and may include both volatile and non-volatile memory. A battery 1106 is provided as a power source for the glove interface object 104. A motion detection module 1108 may include any of various kinds of motion sensitive hardware, such as a magnetometer 1110, an accelerometer 1112, and a gyroscope 1114.

The glove interface object 104 includes speakers 1120 for providing audio output. Also, a microphone 1122 may be included for capturing audio from the real environment, including sounds from the ambient environment, speech made by the user, etc. The glove interface object 104 includes tactile feedback module 1124 for providing tactile feedback to the user. In one embodiment, the tactile feedback module 1124 is capable of causing movement and/or vibration of the glove interface object 104 so as to provide tactile feedback to the user.

LEDs 1126 are provided as visual indicators of statuses of the glove interface object 104. For example, an LED may indicate battery level, power on, etc. A USB interface 1130 is included as one example of an interface for enabling connection of peripheral devices, or connection to other devices, such as other portable devices, computers, etc. In various embodiments of the glove interface object 104, any of various kinds of interfaces may be included to enable greater connectivity of the glove interface object 104.

A WiFi module 1132 is included for enabling connection to the Internet or a local area network via wireless networking technologies. Also, the glove interface object 104 includes a Bluetooth module 1134 for enabling wireless connection to other devices. A communications link 1136 may also be included for connection to other devices. In one embodiment, the communications link 1136 utilizes infrared transmission for wireless communication. In other embodiments, the communications link 1136 may utilize any of various wireless or wired transmission protocols for communication with other devices.

Input buttons/sensors 1138 are included to provide an input interface for the user. Any of various kinds of input interfaces may be included, such as buttons, touchpad, joystick, trackball, etc. An ultra-some communication module 1140 may be included in glove interface object 104 for facilitating communication with other devices via ultra-some technologies.

Bio-sensors 1142 are included to enable detection of physiological data from a user. In one embodiment, the bio-sensors 1142 include one or more dry electrodes for detecting bio-electric signals of the user through the user's skin.

The foregoing components of glove interface object 104 have been described as merely exemplary components that may be included in glove interface object 104. In various embodiments of the invention, the glove interface object 104 may or may not include some of the various aforementioned components. Embodiments of the glove interface object 104 may additionally include other components not presently described, but known in the art, for purposes of facilitating aspects of the present invention as herein described.

It will be appreciated by those skilled in the art that in various embodiments of the invention, the aforementioned glove interface object may be utilized in conjunction with an interactive application displayed on a display to provide various interactive functions. The exemplary embodiments described herein are provided by way of example only, and not by way of limitation.

Figure 12:
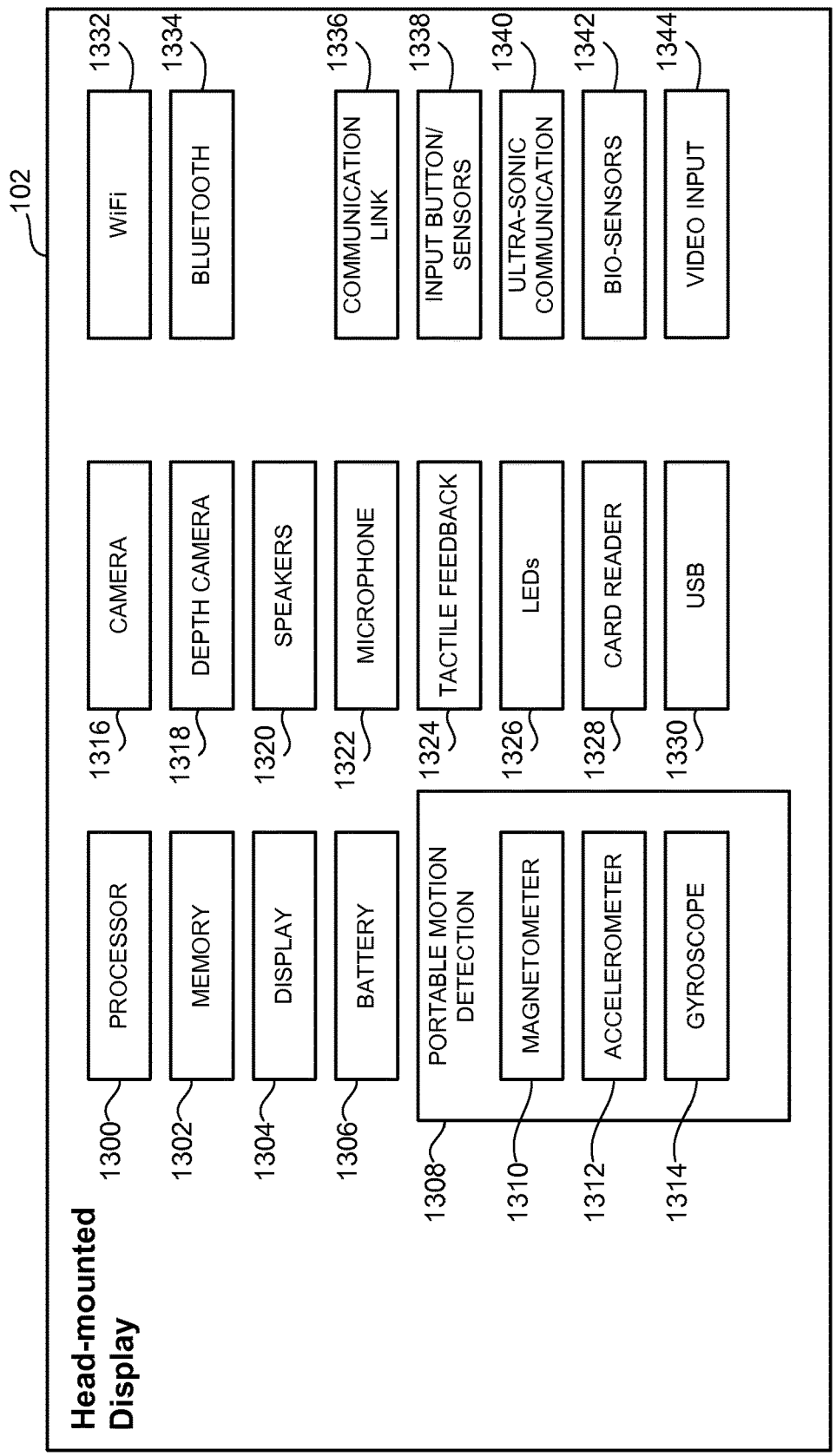
FIG. 12 illustrates components of a head-mounted display, in accordance with an embodiment of the invention.

With reference to FIG. 12, a diagram illustrating components of a head-mounted display 102 is shown, in accordance with an embodiment of the invention. The head-mounted display 102 includes a processor 1300 for executing program instructions. A memory 1302 is provided for storage purposes, and may include both volatile and non-volatile memory. A display 1304 is included which provides a visual interface that a user may view. A battery 1306 is provided as a power source for the head-mounted display 102. A motion detection module 1308 may include any of various kinds of motion sensitive hardware, such as a magnetometer 1310, an accelerometer 1312, and a gyroscope 1314.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1312 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 1310 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 1312 is used together with magnetometer 1310 to obtain the inclination and azimuth of the head-mounted display 102.

In some implementations, the magnetometers of the head-mounted display are configured so as to be read during times when electromagnets in other nearby devices are inactive.

A gyroscope is a device for measuring or maintaining orientation, based on the principles of angular momentum. In one embodiment, three gyroscopes 1314 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 1316 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 1318 may be included in the head-mounted display 102 for sensing depth information of objects in a real environment.

The head-mounted display 102 includes speakers 1320 for providing audio output. Also, a microphone 1322 may be included for capturing audio from the real environment, including sounds from the ambient environment, speech made by the user, etc. The head-mounted display 102 includes tactile feedback module 1324 for providing tactile feedback to the user. In one embodiment, the tactile feedback module 1324 is capable of causing movement and/or vibration of the head-mounted display 102 so as to provide tactile feedback to the user.

LEDs 1326 are provided as visual indicators of statuses of the head-mounted display 102. For example, an LED may indicate battery level, power on, etc. A card reader 1328 is provided to enable the head-mounted display 102 to read and write information to and from a memory card. A USB interface 1330 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A WiFi module 1332 is included for enabling connection to the Internet or a local area network via wireless networking technologies. Also, the head-mounted display 102 includes a Bluetooth module 1334 for enabling wireless connection to other devices. A communications link 1336 may also be included for connection to other devices. In one embodiment, the communications link 1336 utilizes infrared transmission for wireless communication. In other embodiments, the communications link 1336 may utilize any of various wireless or wired transmission protocols for communication with other devices.

Input buttons/sensors 1338 are included to provide an input interface for the user. Any of various kinds of input interfaces may be included, such as buttons, touchpad, joystick, trackball, etc. An ultra-some communication module 1340 may be included in head-mounted display 102 for facilitating communication with other devices via ultra-some technologies.

Bio-sensors 1342 are included to enable detection of physiological data from a user. In one embodiment, the bio-sensors 1342 include one or more dry electrodes for detecting bio-electric signals of the user through the user's skin.

A video input 1344 is configured to receive a video signal from a primary processing computer (e.g. main game console) for rendering on the HMD. In some implementations, the video input is an HDMI input.

The foregoing components of head-mounted display 102 have been described as merely exemplary components that may be included in head-mounted display 102. In various embodiments of the invention, the head-mounted display 102 may or may not include some of the various aforementioned components. Embodiments of the head-mounted display 102 may additionally include other components not presently described, but known in the art, for purposes of facilitating aspects of the present invention as herein described.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the present disclosure.

What is claimed is:

1. A glove interface object, comprising:
    a plurality of magnetic objects positioned on a first side of the glove interface object;
    a plurality of electromagnets positioned on a second side of the glove interface object opposite the first side, the plurality of electromagnets being positioned substantially opposite the plurality of magnetic objects, wherein each electromagnet is configured when activated to attract one or more of the magnetic objects;
    a controller configured to control activation and deactivation of the electromagnets based on received haptic feedback data;
    wherein the haptic feedback data is at least partially defined based on contact by a virtual hand holding a virtual object in a virtual environment, the contact being modeled to determine pressures correlated to different regions of a first finger of the virtual hand and different regions of a second finger of the virtual hand by the virtual object over time, wherein the haptic feedback data provides for activation and deactivation of portions of the electromagnets that are configured to attract corresponding portions of the magnetic objects, wherein the portions of the magnetic objects being positioned on regions of a first finger of the glove interface object and regions of a second finger of the glove interface object that respectively correspond to the regions of the first and second fingers of the virtual hand that contact the virtual object;

wherein the haptic feedback data defines a strength of activation and a duration of activation for each of the portions of the electromagnets of the glove interface object based on the determined pressures over time, wherein the strength of activation for each of the portions of the electromagnets is respectively correlated to a level of pressure exerted on each of the regions of the first and second fingers of the virtual hand that contact the virtual object.

2. The glove interface object of claim 1, wherein the haptic feedback data provides for deactivation of a second portion of the electromagnets that are configured to attract a second portion of the magnetic objects, the second portion of the magnetic objects positioned on a region of the glove interface object that corresponds to a region of the virtual hand that does not contact the virtual object.

3. The glove interface object of claim 1,
wherein the plurality of magnetic objects includes at least one magnetic object defined on at least one phalange segment of each finger portion of the glove interface object;
wherein the plurality of electromagnets includes at least one electromagnet defined on at least one phalange segment of each finger portion of the glove interface object.

4. The glove interface object of claim 1, further comprising at least one sensor configured to generate data identifying a pose of at least a portion of the glove interface object.

5. The glove interface object of claim 1, wherein each of the magnetic objects includes a ferromagnetic material.

6. The glove interface object of claim 1,
wherein the first side is a palmar side of the glove interface object; and
wherein the second side is a dorsal side of the glove interface object.

7. The glove interface object of claim 1,
wherein the plurality of magnetic objects are distributed throughout the first side of the glove interface object, including at least one magnetic object on each finger portion of the glove interface object and at least one magnetic object on a palmar portion of the glove interface object;
wherein the plurality of electromagnets are distributed throughout the second side of the glove interface object, including at least one electromagnet on each finger portion of the glove interface object and at least one electromagnet on a the palmar portion of the glove interface object.

8. The glove interface object of claim 1, wherein the pressures exerted on the different regions of the first and second fingers of the virtual hand change independently in response to translational movements of the glove interface object during the holding of the virtual object by the virtual hand.

9. The glove interface object of claim 8, wherein the changes in the pressures exerted on the different regions of the first and second fingers of the virtual hand cause respective changes to strengths of activation of corresponding portions of the electromagnets on the first and second fingers of the glove interface object.

10. A system, comprising:
a glove interface object, including,
a plurality of magnetic objects distributed throughout a first side of the glove interface object,
a plurality of electromagnets distributed throughout a second side of the glove interface object opposite the first side, the plurality of electromagnets being positioned substantially opposite the plurality of magnetic objects, wherein each electromagnet is configured when activated to attract one or more of the magnetic objects,
a controller configured to selectively control activation and deactivation of the electromagnets based on received haptic feedback data;
a computing device configured to execute an interactive application to generate a virtual environment, and generate the haptic feedback data based on contact by a virtual hand holding a virtual object in the virtual environment, the contact being modeled to determine pressures correlated to different regions of a first finger of the virtual hand and different regions of a second finger of the virtual hand by the virtual object over time, wherein the haptic feedback data provides for activation and deactivation of portions of the electromagnets that are configured to attract corresponding portions of the magnetic objects,
wherein the portions of the magnetic objects being positioned on regions of a first finger of the glove interface object and regions of a second finger of the glove interface object that respectively correspond to the regions of the first and second fingers of the virtual hand that contact the virtual object,
wherein the haptic feedback data defines a duration of activation for each of the portions of the electromagnets of the glove interface object based on the determined pressures over time.

11. The system of claim 10, wherein the haptic feedback data provides for deactivation of a second portion of the electromagnets that are configured to attract a second portion of the magnetic objects, the second portion of the magnetic objects positioned on a region of the glove interface object that corresponds to a region of the virtual hand that does not contact the virtual object.

12. The system of claim 10, wherein the haptic feedback data defines a strength of activation of the portion of the electromagnets based on the determined pressure over time, wherein the strength of activation is correlated to a level of pressure exerted on the regions of the virtual hand that contact the virtual object.

13. The system of claim 10,
wherein the plurality of magnetic objects includes at least one magnetic object defined on at least one phalange segment of each finger portion of the glove interface object;
wherein the plurality of electromagnets includes at least one electromagnet defined on at least one phalange segment of each finger portion of the glove interface object.

14. The system of claim 10, wherein the glove interface object further includes at least one sensor configured to generate data identifying a pose of at least a portion of the glove interface object.

15. The system of claim 10, wherein each of the magnetic objects includes a ferromagnetic material.

16. The system of claim 10, wherein the computing device is configured to generate video data for rendering on a head-mounted display, the video data configured to provide a view of the virtual environment when rendered on the head-mounted display.

17. A method, comprising:
receiving haptic feedback data, wherein the haptic feedback data is at least partially defined based on contact by a virtual hand holding a virtual object in a virtual environment, the contact being modeled to determine pressures correlated to different regions of a first finger of the virtual hand and different regions of a second finger of the virtual hand by the virtual object over time;
applying the haptic feedback data to activate and deactivate portions of a plurality of electromagnets on a glove interface object that are configured to attract corresponding portions of a plurality of magnetic objects on the glove interface objects,
wherein the portions of the magnetic objects being positioned on regions of a first finger of the glove interface object and regions of a second finger of the glove interface object that correspond to the regions of the first and second fingers of the virtual hand that contact the virtual object,
wherein the haptic feedback data defines a strength of activation and a duration of activation for each of the portions of the electromagnets of the glove interface object based on the determined pressures over time, wherein the strength of activation for each of the portions of the electromagnets is respectively correlated to a level of pressure exerted on each of the regions of the first and second fingers of the virtual hand that contact the virtual object;
wherein the plurality of magnetic objects are positioned on a first side of the glove interface object,
wherein the plurality of electromagnets are positioned on a second side of the glove interface object opposite the first side, the plurality of electromagnets being positioned substantially opposite the plurality of magnetic objects.

18. The method of claim 17, wherein the haptic feedback data provides for deactivation of a second portion of the electromagnets that are configured to attract a second portion of the magnetic objects, the second portion of the magnetic objects positioned on a region of the glove interface object that corresponds to a region of the virtual hand that does not contact the virtual object.

19. The method of claim 17,
wherein the plurality of magnetic objects includes at least one magnetic object defined on at least one phalange segment of each finger portion of the glove interface object;
wherein the plurality of electromagnets includes at least one electromagnet defined on at least one phalange segment of each finger portion of the glove interface object.

20. The method of claim 17,
wherein the first side is a palmar side of the glove interface object; and
wherein the second side is a dorsal side of the glove interface object.

* * * * *